US011531645B2

(12) United States Patent
Liszka et al.

(10) Patent No.: US 11,531,645 B2
(45) Date of Patent: Dec. 20, 2022

(54) METHOD, APPARATUS AND COMPUTER PROGRAM PRODUCT FOR IMPROVING DATA INDEXING IN A GROUP-BASED COMMUNICATION PLATFORM

(71) Applicant: SLACK TECHNOLOGIES, INC., San Francisco, CA (US)

(72) Inventors: Jason Liszka, New York, NY (US);
John Gallagher, New York, NY (US);
Shaun Sabo, Mountain View, CA (US);
Joshua Wills, San Francisco, CA (US);
Noah Weiss, New York, NY (US);
Ryan Park, San Francisco, CA (US);
Ananth Packkildurai, San Francisco, CA (US); Stanislav Vyacheslavovich Babourine, Walnut Creek, CA (US)

(73) Assignee: Slack Technologies, LLC, San Francisco, CA (US)

( * ) Notice: Subject to any disclaimer, the term of this patent is extended or adjusted under 35 U.S.C. 154(b) by 473 days.

(21) Appl. No.: 15/844,094

(22) Filed: Dec. 15, 2017

(65) Prior Publication Data
US 2019/0188278 A1    Jun. 20, 2019

(51) Int. Cl.
*G06F 16/13*    (2019.01)
*G06F 16/11*    (2019.01)
(Continued)

(52) U.S. Cl.
CPC ............ *G06F 16/13* (2019.01); *G06F 16/125* (2019.01); *G06F 16/128* (2019.01);
(Continued)

(58) Field of Classification Search
CPC ........ G06F 16/13; G06F 16/27; G06F 16/125; G06F 16/178; G06F 16/128; H04L 51/04; H04L 67/1095; H04L 51/216; H04L 51/42
See application file for complete search history.

(56) References Cited

U.S. PATENT DOCUMENTS 7,499,926 B1 * 3/2009 Burckart ............. H04L 12/1831
2005/0080859 A1 * 4/2005 Lake ....................... H04L 51/04
                                                                    709/206
(Continued)

OTHER PUBLICATIONS

Collection Aliasing: Near Real-Time Search for Really Big Data [online] [retrieved Feb. 7, 2018]. Retrieved from the internet: <URL: https://blog.cloudera.com/blog/2013/10/collection-aliasing-near-real-time-search-for-really-big-data/>. (dated Oct. 25, 2013) 16 pages.

(Continued)

*Primary Examiner* — Cam Y T Truong
(74) *Attorney, Agent, or Firm* — Lee & Hayes, P.C.

(57) ABSTRACT

Methods, apparatus and computer program product for improving data indexing in a group-based communication platform are described herein. The group-based communication platform having a computed collection and one or more live collections. The computer-implemented method includes generating a new collection, the new collection being generated at a snapshot time point; associating a collection manager with the new collection; retrieving a plurality of electronic messages from the computed collection and the one or more live collections; writing the plurality of electronic messages to the new collection, the writing being completed at a cut-over time point; synchronizing the new collection with the one or more live collections based on the plurality of electronic messages; and
(Continued)

redirecting the read alias and the write alias from the computed collection to the new collection.

16 Claims, 13 Drawing Sheets

(51) Int. Cl.
  *G06F 16/178* (2019.01)
  *G06F 16/27* (2019.01)
  *H04L 51/216* (2022.01)
(52) U.S. Cl.
  CPC ............ *G06F 16/178* (2019.01); *G06F 16/27* (2019.01); *H04L 51/216* (2022.05)

(56) References Cited

U.S. PATENT DOCUMENTS

| | | | |
|---|---|---|---|
| 2012/0110279 A1 | 5/2012 | Fredricksen et al. | |
| 2014/0359029 A1* | 12/2014 | Jagadish | H04L 51/046 709/206 |
| 2015/0032707 A1* | 1/2015 | Barykin | G06F 16/125 707/694 |
| 2016/0080491 A1* | 3/2016 | Sykes | H04L 67/1097 709/219 |
| 2016/0147809 A1 | 5/2016 | Schreter et al. | |
| 2018/0287982 A1 | 10/2018 | Draeger et al. | |

OTHER PUBLICATIONS

Anshum's Blog: Information Retrieval and all things related: Collection Aliasing in SolrCloud [online][retrieved Feb. 7, 2018] Retrieved from the internet: <URL: http://www.anshumgupta.net/2013/10/collection-aliasing-in-solrcloud.html>. (dated Oct. 29, 2013) 2 pages.
International Search Report and Written Opinion for corresponding International Application No. PCT/US2018/065736, dated Mar. 4, 2019, 10 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, Is Valued at $1.1 Billion", The New York Times Blogs (BITS), LexisNexis, https://advancelexis.com/api/permalink/3eb84b34-a8f9-4d7d-9573-89d9598a4963/?context=1000516> (dated Oct. 31, 2014) 2 pages.
Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking up the Slack", Tedium, [online][retrieved May 9, 2019], Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
"Die, Email, Die! A Flickr Cofounder Aims to Cut Us All Some Slack", ReadWriteWeb, LexisNexis, https://advancelexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—A New Communication System Based on Awareness and Text Communications-", FUJITSU Sci. Tech. J., 36, 2, (Dec. 2000) 154-161.

* cited by examiner

METHOD, APPARATUS AND COMPUTER PROGRAM PRODUCT FOR IMPROVING DATA INDEXING IN A GROUP-BASED COMMUNICATION PLATFORM

BACKGROUND

Various methods, apparatus, and systems are configured to improve data indexing in a group-based communication platform. Applicant has identified many deficiencies and problems associated with existing methods, apparatus, and systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatus, systems, computing devices, and/or the like for improving data indexing in a group-based communication platform.

In accordance with one aspect, a computer-implemented method for improving data indexing in a group-based communication platform is provided. The group-based communication platform includes a computed collection and one or more live collections. The computer-implemented method comprises generating, by a server circuitry, a new collection, the new collection being generated at a snapshot time point; associating, by the server circuitry, a collection manager with the new collection, the collection manager having a read alias and a write alias pointing to the computed collection and the one or more live collections; retrieving, by the server circuitry, a plurality of electronic messages from the computed collection and the one or more live collections, each electronic message having a message generation timestamp indicating a message generation time point prior to a first pre-determined time period before the snapshot time point; writing, by the server circuitry, the plurality of electronic messages to the new collection, the writing being completed at a cut-over time point; synchronizing, by the server circuitry, the new collection with the one or more live collections based on the plurality of electronic messages; and redirecting, by the server circuitry, the read alias and the write alias from the computed collection to the new collection.

In accordance with another aspect, synchronizing, by the server circuitry, the new collection the one or more live collections based on the plurality of electronic messages further comprises querying, by the server circuitry, the plurality of electronic messages; retrieving, by the server circuitry, one or more modified electronic messages, each modified electronic message having a message modification timestamp indicating a message modification time point between the snapshot time point and the cut-over time point; and transmitting, by the server circuitry, the one or more modified electronic messages to the new collection.

In accordance with another aspect, the new collection comprises a plurality of shards, wherein each shard stores message data related to a plurality of existing electronic messages and at least one index file associated with the message data.

In accordance with another aspect, the at least one index file is generated by creating composite dimensions based on the message data; generating DocJoin structures based on the composite dimensions; and outputting at least one index file based on the DocJoin structures.

In accordance with another aspect, the computed index collection comprises a plurality of index files, the plurality of index files being associated with a plurality of existing electronic messages, the plurality of existing electronic messages being generated prior to a second pre-determined time period before the snapshot time point.

In accordance with another aspect, the computer-implemented method further identifying, by the server circuitry, at least one live collection associated with the plurality of electronic messages from the one or more live collections; and disconnecting, by the server circuitry, the at least one live collection from the read alias and the write alias.

In accordance with another aspect, synchronizing, by the server circuitry, the new collection with the one or more live collections based on the plurality of electronic messages, further comprises retrieving a retention policy associated with the plurality of electronic messages; and updating the new collection based on the retention policy.

In accordance with another aspect, an apparatus comprising at least one processor and at least one non-transitory memory is provided. In some embodiments, the at least one non-transitory memory and the program code configured to, with the processor, cause the apparatus to at least generate, by a server circuitry, a new collection, the new collection being generated at a snapshot time point; associate, by the server circuitry, a collection manager with the new collection, the collection manager having a read alias and a write alias pointing to the computed collection and the one or more live collections; retrieve, by the server circuitry, a plurality of electronic messages from the computed collection and the one or more live collections, each electronic message having a message generation timestamp indicating a message generation time point prior to a first pre-determined time period before the snapshot time point; write, by the server circuitry, the plurality of electronic messages to the new collection, the writing being completed at a cut-over time point; synchronize, by the server circuitry, the new collection with the one or more live collections based on the plurality of electronic messages; and redirect, by the server circuitry, the read alias and the write alias from the computed collection to the new collection.

In accordance with another aspect, a computer program product is provided. The computer program product may comprise at least one computer-readable storage medium having computer-readable program code portions stored therein, the computer-readable program code portions comprising executable portions configured to generate, by a server circuitry, a new collection, the new collection being generated at a snapshot time point; associate, by the server circuitry, a collection manager with the new collection, the collection manager having a read alias and a write alias pointing to the computed collection and the one or more live collections; retrieve, by the server circuitry, a plurality of electronic messages from the computed collection and the one or more live collections, each electronic message having a message generation timestamp indicating a message generation time point prior to a first pre-determined time period before the snapshot time point; write, by the server circuitry, the plurality of electronic messages to the new collection, the writing being completed at a cut-over time point; synchronize, by the server circuitry, the new collection with the one or more live collections based on the plurality of electronic messages; and redirect, by the server circuitry, the read alias and the write alias from the computed collection to the new collection.

BRIEF DESCRIPTION OF THE DRAWINGS

Figure 1:
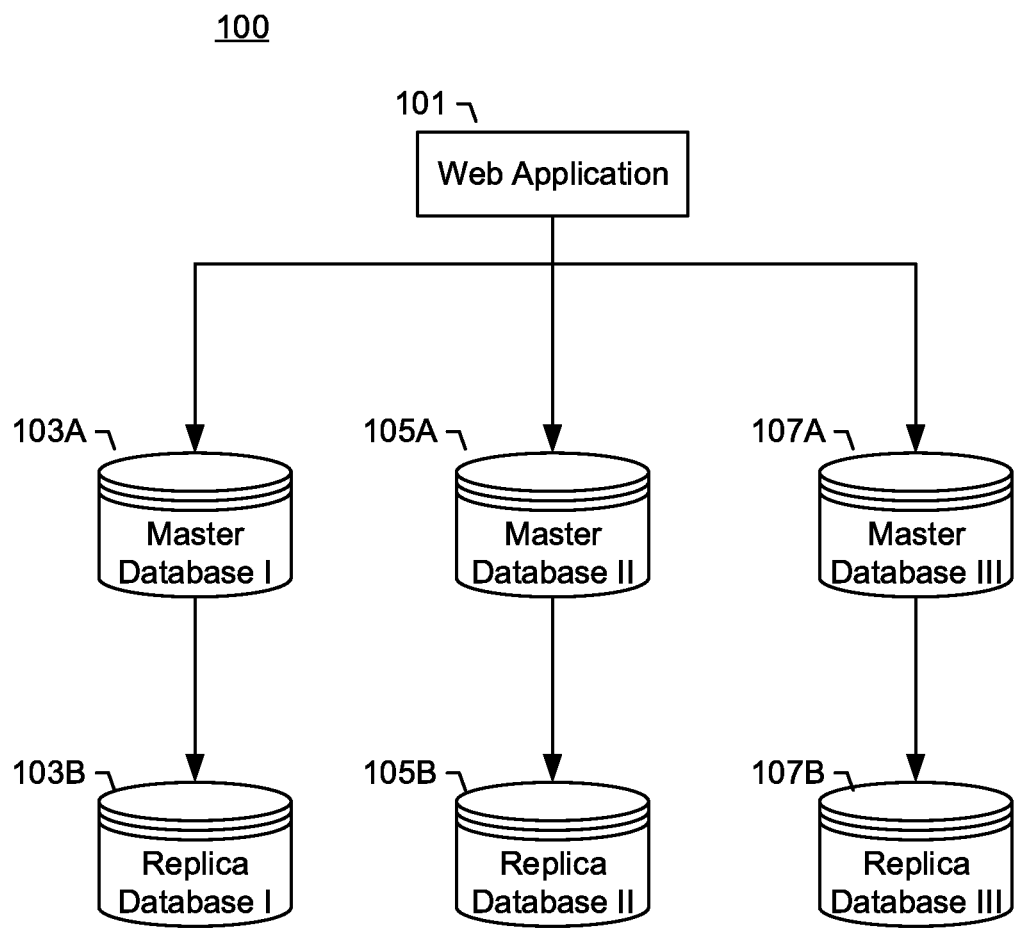
Figure 5A:
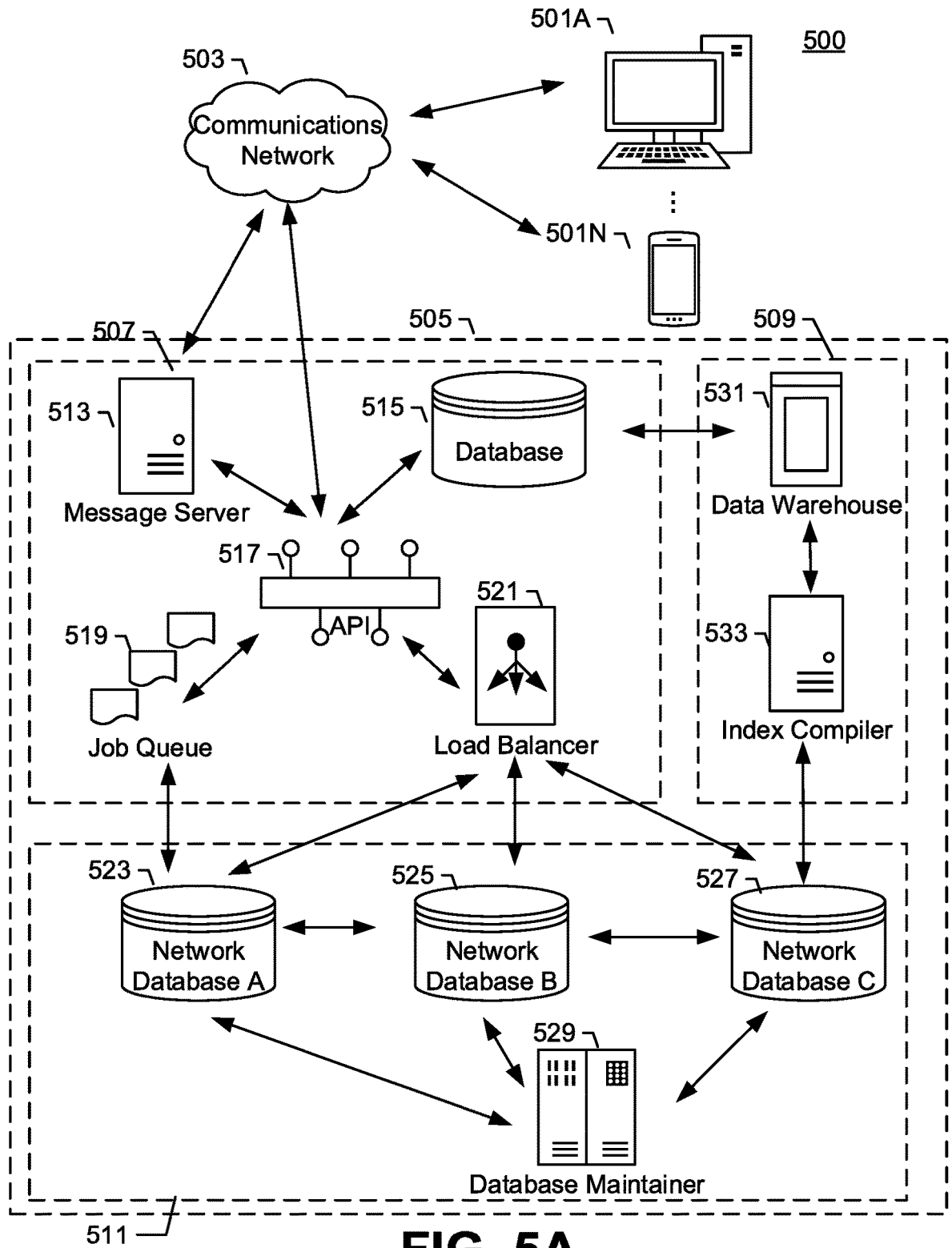
Figure 5B:
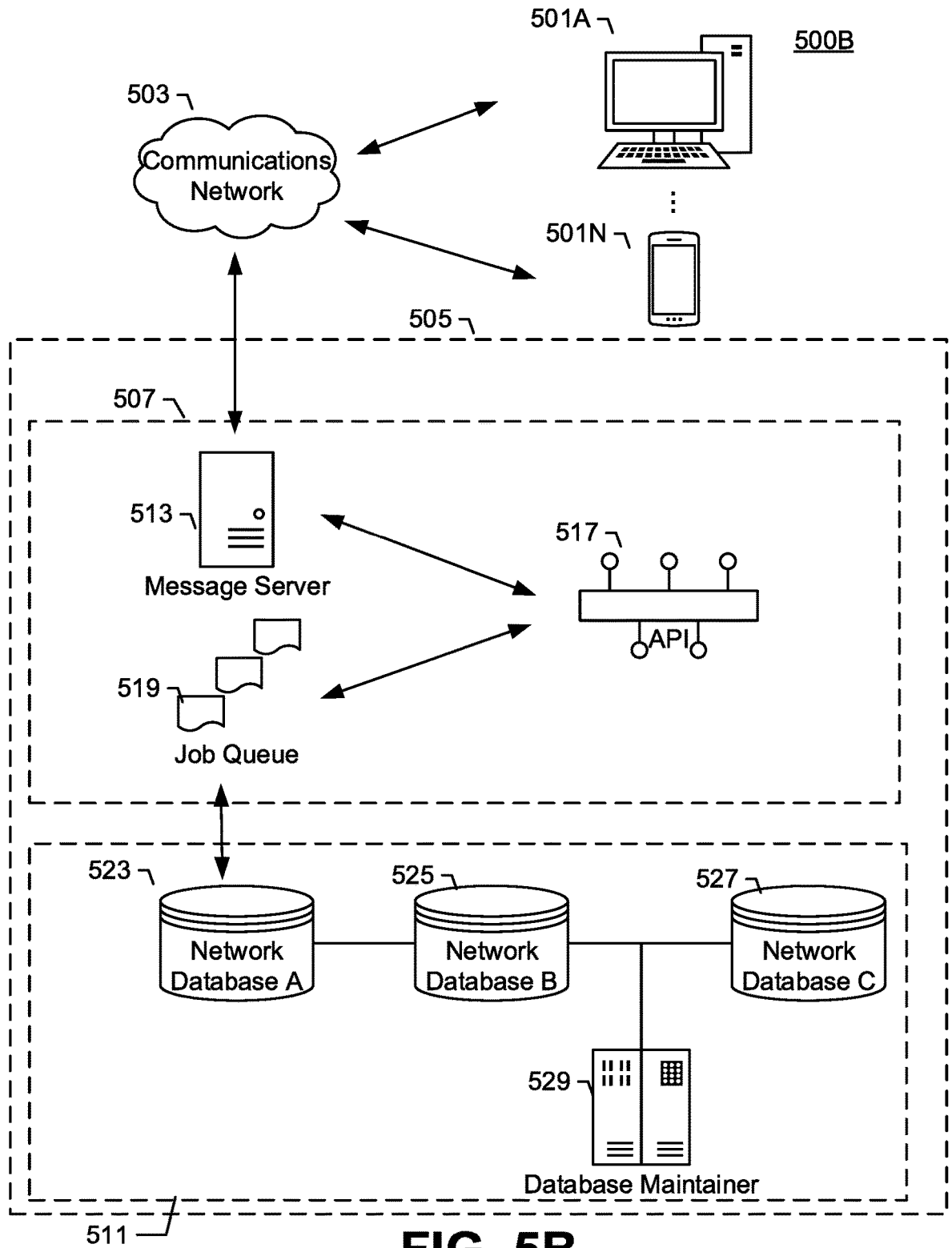
Figure 5C:
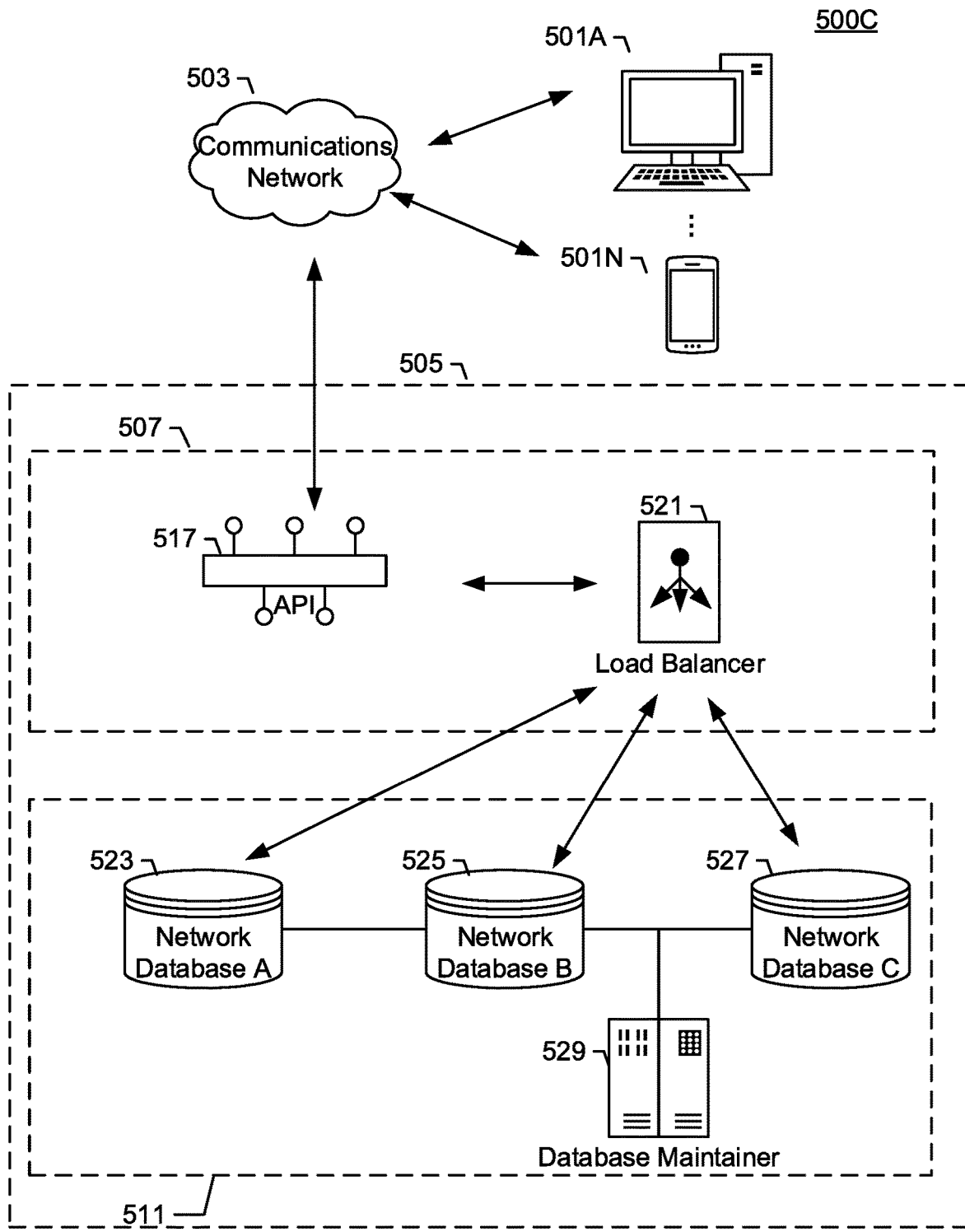
Figure 6:
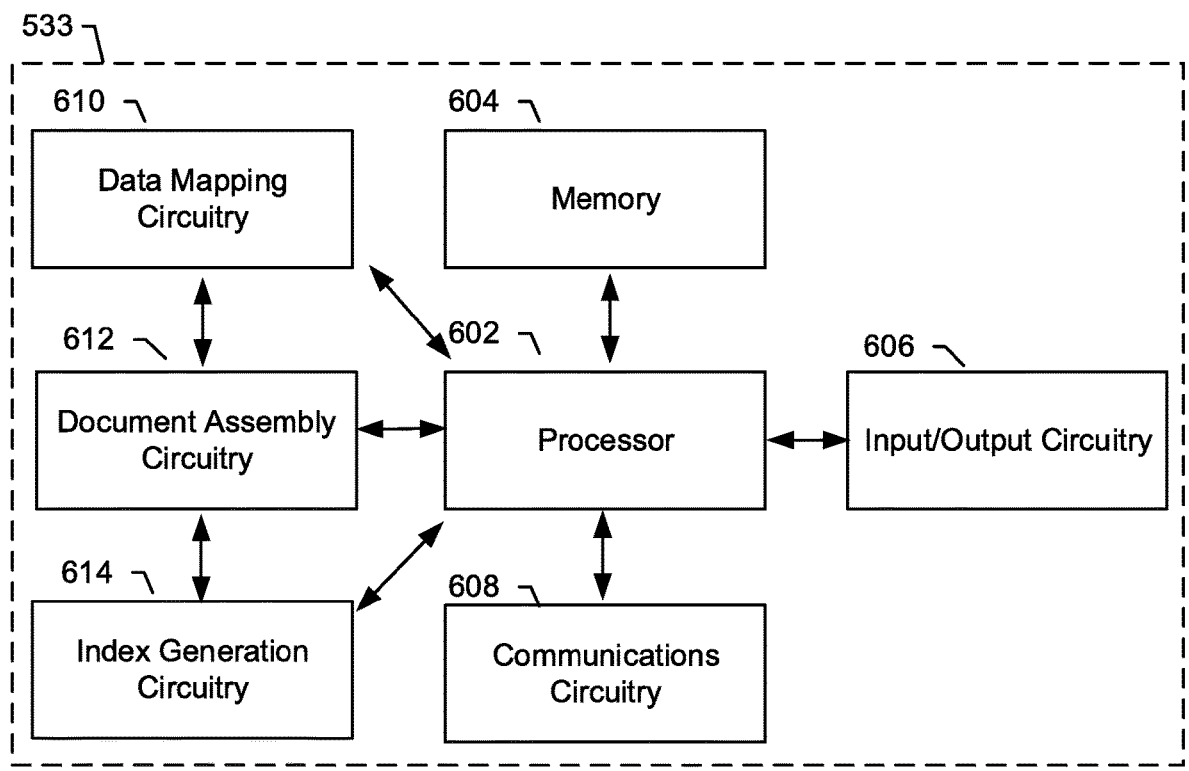
Figure 7:
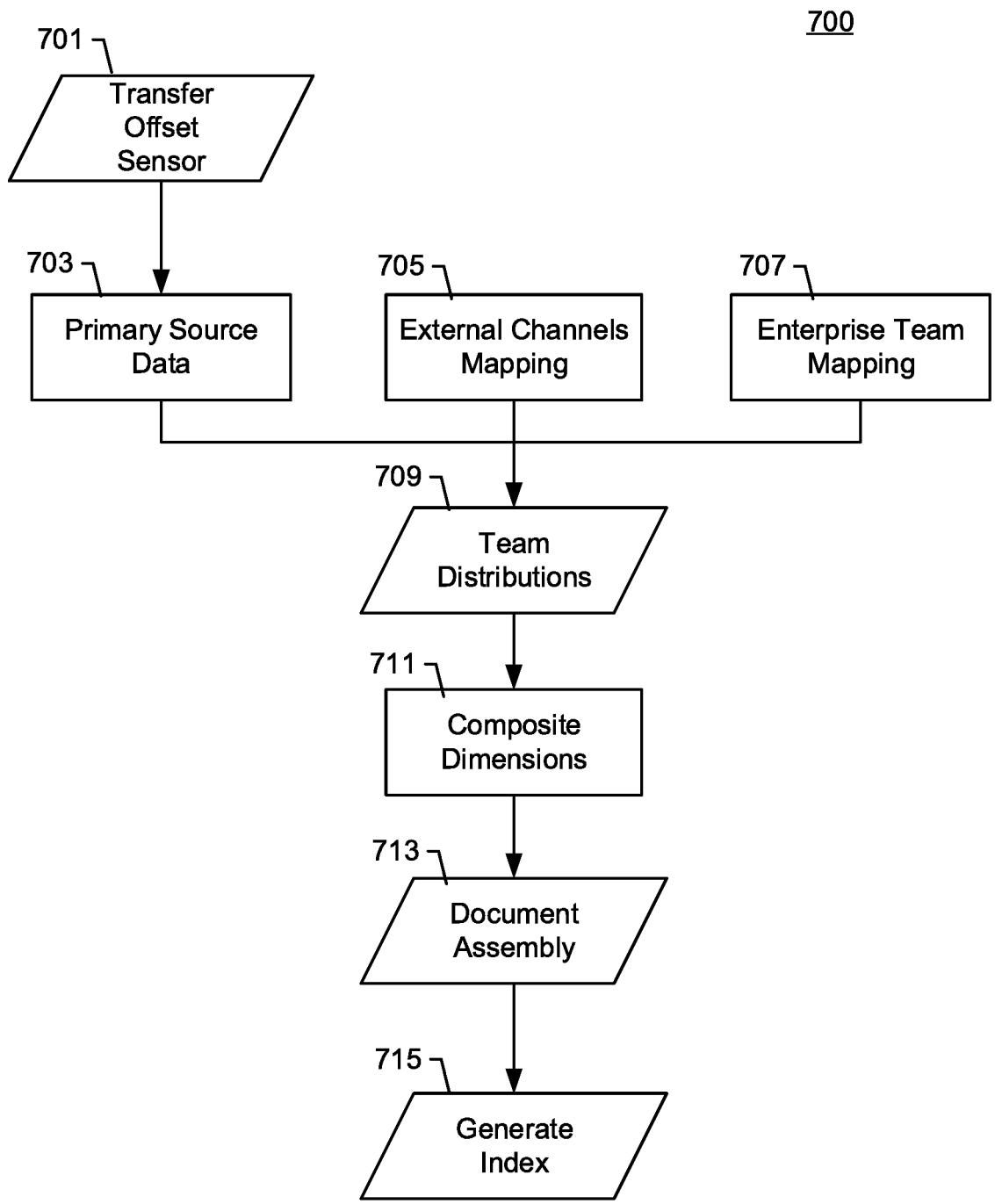
Figure 8:
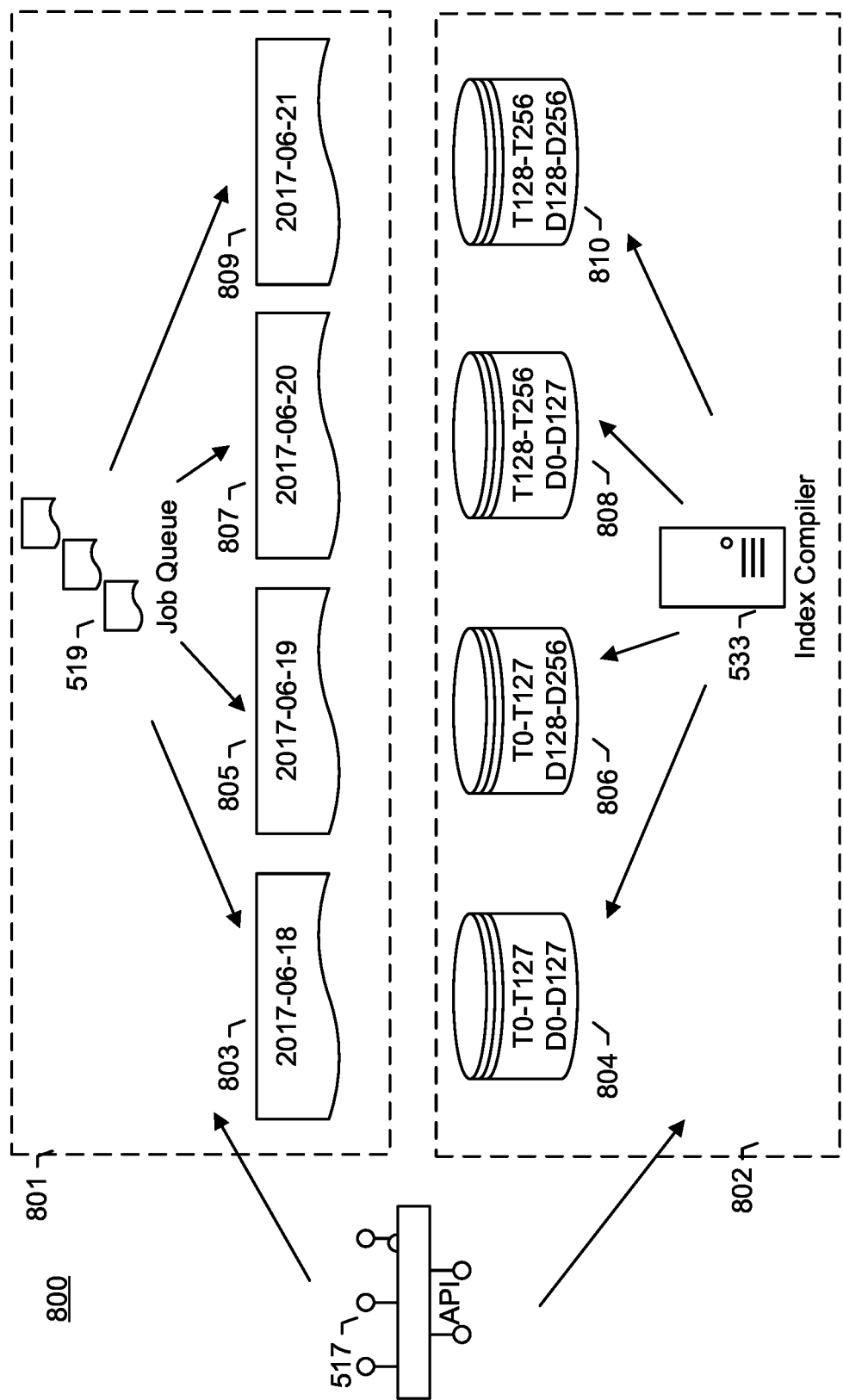

Having thus described some embodiments in general terms, references will now be made to the accompanying drawings, which are not drawn to scale, and wherein:

FIG. 1 is an example system architecture schema of a group-based communication platform;

FIGS. 2, 3, 4a, and 4b are example diagrams illustrating disadvantages of conventions systems;

FIG. 5A is an example system infrastructure diagram of a group-based communication platform in accordance with some embodiments of the present invention;

FIGS. 5B-5C are example data flow diagrams in accordance with some embodiments of the present invention;

FIG. 6 is an example schematic diagram in accordance with some embodiments of the present invention;

FIG. 7 is an example flow chart illustrating example methods in accordance with some embodiments of the present invention;

FIG. 8 is an example data flow diagram in accordance with some embodiments of the present invention; and FIGS. 9, 10, 11, and 12 are example operation diagrams illustrating example methods in accordance with some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention relate generally to facilitating data indexing and processing in network databases. More specifically, various embodiments of the present invention are related to indexing electronic message data in a group-based communication platform, and provide improvements in data management as well as index compiling and storage.

FIG. 1 illustrates an example sharded search cluster 100. In FIG. 1, web application 101 handles streams of various electronic message data in the group-based communication platform. The web application may handle indexing, formatting, and various database operations, such as data read and write. The web application may further query various databases in the group-based communication platform. The web application may be written in various database scripting languages. In some embodiments, the web application is written in PHP.

As shown in FIG. 1, the sharded search cluster 100 utilizes several databases, such as master databases 103A, 105A, and 107A, as data repositories for storing data related to the group-based communication platform, such as index files. In some embodiments, each master database has a replicate database, such as replica database 103B, 105B, and 107B, each of which mirrors the corresponding master database. Each database may be implemented in a plurality of database structures, including, for example, as an Apache® Solr node. In some embodiments, data related to a particular team or group in the group-based communication platform may reside in a single database shard.

Existing systems and approaches are plagued by many technical restrictions and limitations. For example, as indicated above, the databases may be sharded based on teams/groups (referred to a "groups" hereinafter). On one hand, huge amount of data may all reside within a single database shard when there are lot of data communicated within that group. As a result, the index file size for that group can be quite large. On the other hand, some group may have little communication data, and database resources for these groups are idle, resulting small index file size. As such, existing systems and approaches create unevenness in terms of data quantity among various databases, which are illustrated in FIGS. 2 and 3.

Figure 2:
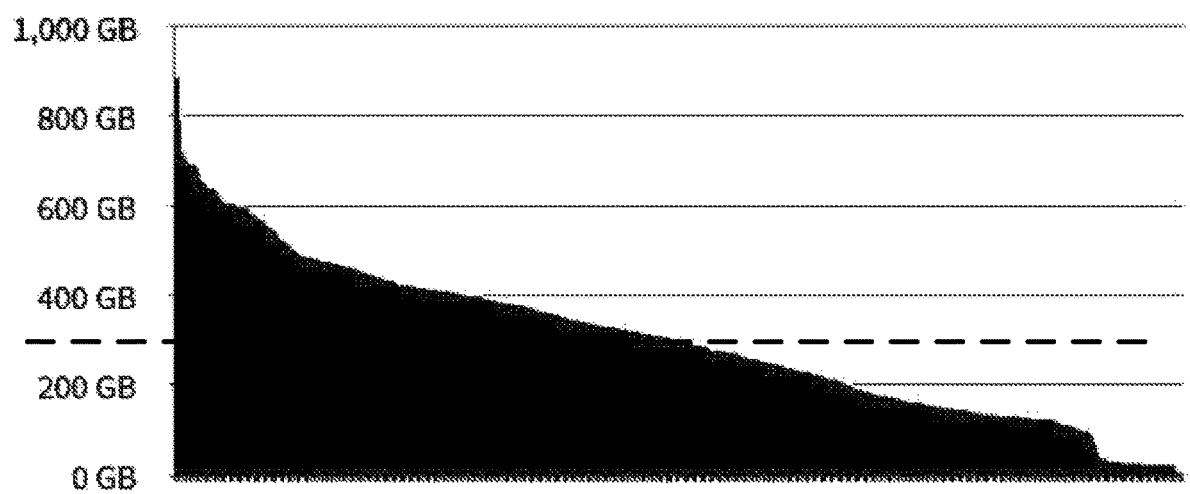
Figure 3:
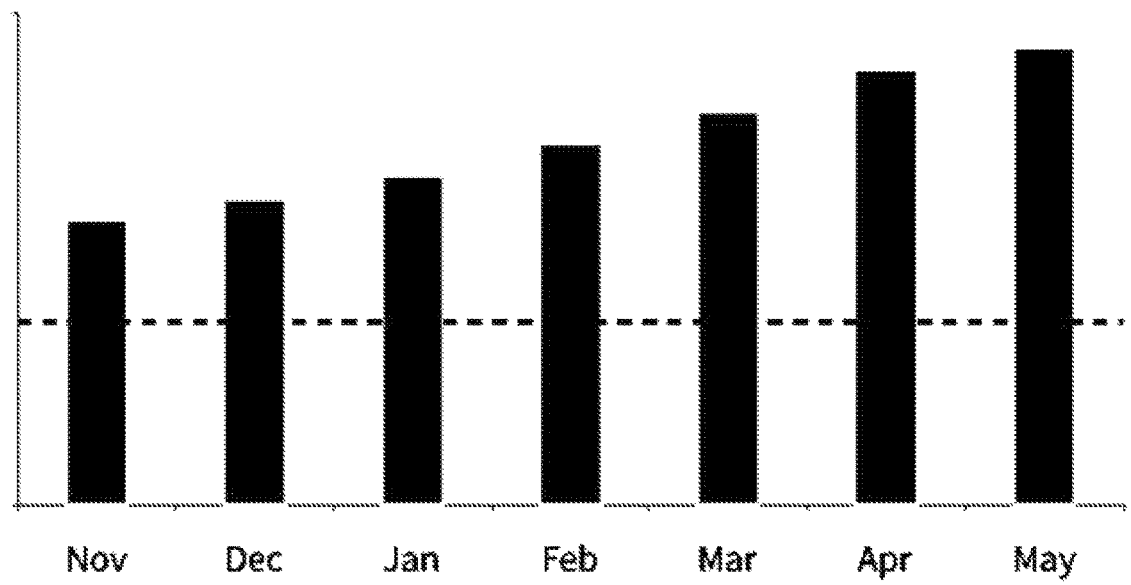

FIG. 2 shows the index size per shard at a particular point of time in some existing systems. As shown in FIG. 2, some shards may have an index size of more than 800 gigabytes (GB), while others may only have an index size of less than 200 GB. This unevenness creates challenges for allocating network resources for these shards. Further, as time goes by, more and more data are added to the group-based communication platform, resulting larger and larger index sizes. This can be problematic when there is a limit or restriction on shard size. For example, as shown in FIG. 2, some existing systems may have a shard size limit of 300 GB, and, as shown in FIG. 3, instances where index sizes exceed 300 GB have grown exponentially from November to May. As such, some existing systems lack the soundness in handling the ever-increasing amount of data.

In addition, uneven shard sizes may create significant differences in terms of search performance. For example, groups on smaller shards may have faster search performance than groups on larger shards, regardless of that group's number of messages. A larger shard size typically indicates that groups on those shards are more active. As such, differences in replication lag between the master database and the replica database are further amplified in uneven shards. If the master databases become unavailable, the search index of a large shard's replica is more likely to miss recent data than that of the replica of a smaller shard.

Some existing systems and approaches may address the above issues through refeeding and/or rebalancing. However, conventional methods can be expensive and time consuming, while exhausting network resources. For example, some existing systems may require a human operator to manually adjust various data into different databases. However, this approach is prone to human errors and inefficiencies, which can be catastrophic. Other existing systems may rely on the production of a separate database, such as a MySQL database, to handle the refeeding and/or rebalancing. However, the required database production exhausts network resources, and also decreases the robustness of the system.

Figure 4A:
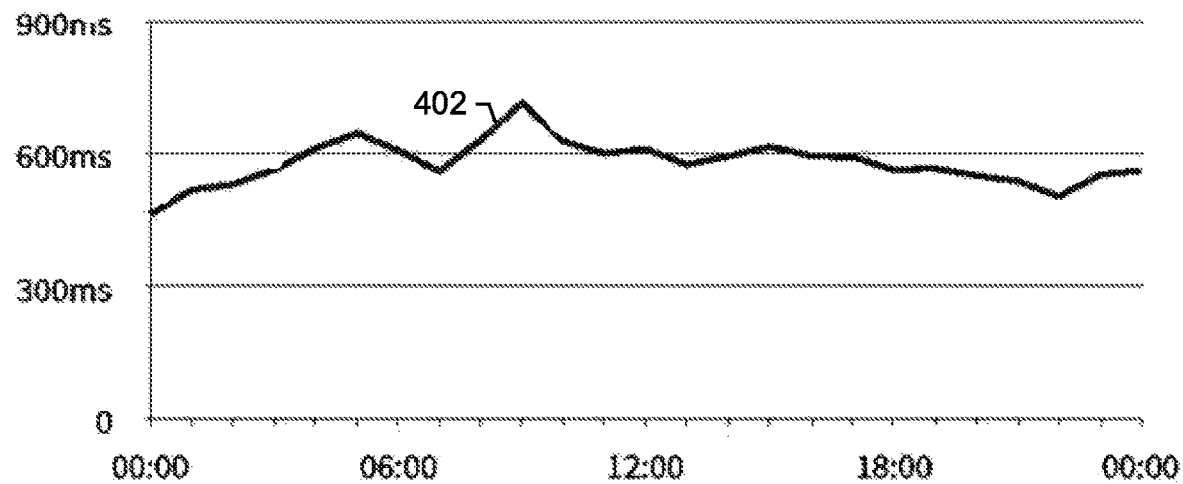
Figure 4B:
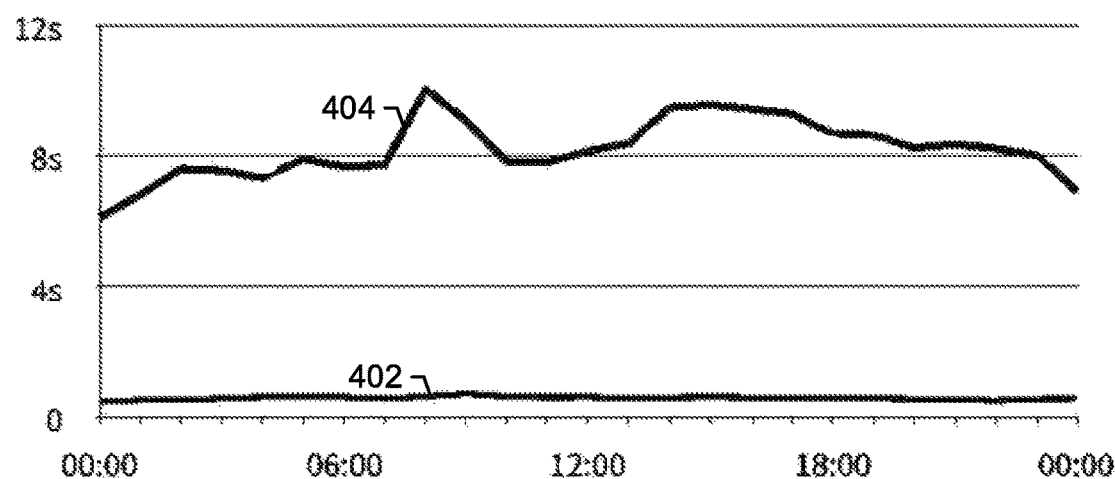

From the user experience perspective, existing systems and approaches also have significant drawbacks. For example, existing systems take a long time to complete various database queries. FIG. 4a illustrates system response time related to user database queries (e.g. a search query) of a typical existing system during a typical day. As shown in FIG. 4a, the medium system response time 402 may fluctuate around 600 ms. However, as shown in FIG. 4b, the $95^{th}$ percentile of the system response time 404 is around 8 s. In other words, some users may have to wait more than eight seconds to receive search results. As such, existing systems fail to keep up with rapidly growing demands from users.

In addition, existing systems fail to maintain data integrity. Because of the various interactions between different components in the platform, an electronic message may be accidently dropped and not indexed. This could be the results of, for example, a code defect, low system memory, etc. In addition, when a user responds to an old electronic message, existing systems fail to update index files to accommodate these changes. Further, when the system is undergoing schema changes, existing systems fail to provide the necessary flexibilities to adjust data indexing and accommodate changes.

Systems structured in accordance with various embodiments of the invention overcome challenges faced by existing systems. For example, in some embodiments of the present invention, the system uses document sharding and uniform placement, instead of team/group sharding. In some embodiments of the present invention, document placement comes from the output of a hashing function (e.g., md5, sha, murmur, etc.), which outputs a roughly uniform distribution of values benefiting from deterministic uniform assignment via hashing. These features of the present invention allow data volumes to be evenly distributed across all shards, and thus reduces the need for data storage increases and upgrades.

In some embodiments of the present invention, each group is assigned to a shard group, and within each group, documents are evenly distributed. This further improves the efficiency of responding to database queries. For example, if (1) every group's data is spread across 2048 shards, (2) each group is assigned into one of 64 shard groups, and (3) each group evenly distributes the documents, then a query only requires responses from 32 shards (2048 divided by 64)), lowering the probability of a slow response for a given query.

In addition, in some embodiments of the present invention, the system rebuilds the message indexes on a regular basis. When rebuilding the indexes, the system may read from a data warehouse other than a production MySQL database, which avoids impacting system production. By implementing this automated process, no human operation is required, which avoid system response latency. Further, these features of the present invention enable the group-based communication platform to pick up any electronic message that may have been accidentally dropped and/or changed, thus providing reliable response.

Further, various embodiments of the present invention provide technical advantages in processing and generating big data sets with parallel, distributed algorithms, such as MapReduce. In a group-based communication platform, electronic messages include message metadata (for example, the message author's name, which may be stored on a user record, or the number of reactions on the message, which may be stored in a separate table). Neither of these pieces of metadata is present on the message record itself, which creates challenges during indexing and searching, especially when the message corpus is large. As described hereinafter, various embodiments of the present invention represent each piece of metadata in a large, in-Attorney memory map, making them part of the indexed message record to further improve data indexing and searching.

As such, systems structured in accordance with various embodiments of the invention provide specific, technical solutions to technical problems faced by existing systems, the details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, and the like; the users referred to herein are accessing a group-based communication or messaging system using client devices (as defined herein).

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users (e.g., a team or affiliated collection of employees in corporate enterprise environments). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "query" refers to a request associated with a database. A "query" may be generated on one or more client devices, and may be transmitted to a group-based communication platform. A query may be a "select query," which is used to extract data from the database in a readable format according to the query. A query may be an "action query," which asks for operations (such as insertion, deletion, and/or updating) on the data stored in a network database.

The term "shard" refers to a collection of related, discrete items of data that may be accessed and managed individually. A shard may be stored in a single database, or optionally spread across multiple databases. This is particularly beneficial when there is a large amount of data. The cost of creating and maintaining a very large database in one place can increase exponentially because the database will require more high-end computers. In contrast, database shards can be distributed across a number of much less expensive commodity databases. "Sharding" refers to partitioning a large database to make it more manageable. Because sharding a database involves breaking up the database into smaller databases that share nothing in common, it creates technical difficulties to create a communication channel that involves two or more database shards. Database may be "sharded" based on a variety of factors, including, but not limited to, channel identifications, user identifications, team identifications, or any attribute of data within database structure. To determine which factor(s) to use, the system may consider data isolation, proximity of data (for the purposes of lookup), and performance/speed of access across a distributed system. The system may need to take into account both the volume of data and the speed with which the system is required to retrieve such data.

The term "index" or "index file" refers to a data structure that improves database system response time when queried with data retrieval operations. For example, indexes allow database system to quickly locate data without having to search every row in a database table every time it is accessed. An index may accept data from many different sources, including, for example, XML files, comma-separated value (CSV) files, data extracted from tables in a database, and files in common file formats such as Microsoft® Word and Adobe® PDF. These data may contain multiple fields, each with a name and containing content, which may be empty. In addition, an index (for example, search index) may be generated after performing analysis or tokenization of the data to be indexed, for example, by removing pluralization, tense, or character casing, so that a searcher need not remember the exact form of a search term in order to retrieve a query. Further, a shard may store its partition of data in index files (for example, search indexes).

Shards may be collectively grouped into "collections." A live collection is created as empty and stored a network database for data related to electronic messages of a specific time range. Once the beginning of that time range arrives, all new data related to electronic messages generated in that time range will be written to that collection. For example, a live collection may be created for Jun. 18, 2017, and data related to electronic messages generated between the beginning of Jun. 18, 2017 and the beginning of Jun. 19, 2017 are written into that live collection. Each shard in the live collection may store index files associated with electronic messages in that shard.

A computed collection is built from dataset processing, such as MapReduce. Once a computed collection is built, it may go through the computed collection synchronization process (as described further hereinafter with regards to FIGS. 9-12). Each shard in the computed collection may store index files associated with electronic messages in that shard.

The term "collection manager" refers to a set of various programming language objects and operations associated with the collections. Collection manager includes various "operation alias," which points to (i.e. refers to) one or more collections and performs operations (such as read and write) on these collections. The collection manager may perform various update operations on the read alias and the write alias, details of which are described hereinafter.

Example System Architecture for Implementing Embodiments of the Present Invention Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 5A illustrates an example system architecture 500 within which embodiments of the present invention may operate. Users may access a group-based communication system 505 via a communications network 503 using client devices 501A-501N.

The client devices 501A-501N may be any computing device as defined above. Electronic data received by group-based communication system 505 from the client devices 501A-501N may be provided in various forms and via various methods. For example, the client devices 501A-501N may include desktop computers, laptop computers, smartphones, netbooks, tablet computers, wearables, and the like.

In embodiments where a client device of client devices 501A-501N is a mobile device, such as a smart phone or tablet, the client device of client devices 501A-501N may execute an "app" to interact with the group-based communication system 505. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client device of client devices 501A-501N may interact with the group-based communication system 505 via a web browser. As yet another example, the client device of client devices 501A-501N may include various hardware or firmware designed to interface with the group-based communication system 505.

Communications network 503 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 503 may include a cellular telephone, an 802.11, 802.16, 802.20, and/or WiMax network. Further, the communications network 503 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

In some embodiments, the group-based communication system 505 comprises an online data management system 507, an offline index management system 509, and a cloud storage system 511.

In some embodiments, the online data management system 507 comprises a message server 513, one or more databases 515, an Application Programming Interface (API) component 517, a job queue component 519, and a load balancer component 521.

The message server 513 may be embodied as a computer or computers. The message server 513 may provide for receiving of electronic data from various sources, including but not limited to the client devices 501A-501N. For example, the message server 513 may be operable to receive and post or transmit group-based messaging communications provided by the client devices 501A-501N via communications network 503.

The API component 517 may be embodied in one or more computers or computing apparatus, such as a server or servers. The API component 517 is a set of routines, protocols and software system tools that facilitate the data transmission among and between various components of the group-based communication system 505. For example, the API component 517 may receive queries from client devices 501A-501N via the communications network 503. It may also receive data from the message server 513. The API component 517 may transmit data to the one or more databases 515 and the job queue component 519, and may further transmit databases queries to the cloud storage system 511 via the load balancer component 521.

Further, the API component 517 provides routines that allow a client to search for messages or message metadata. For example, the search.messages API component has a "query" field and performs a search given that query. It also allows for search of message metadata (for example, has: reaction or has:star, from:john).

The one or more databases 515 may be embodied as a data storage device(s) such as a Network Attached Storage (NAS) device or devices, or as a separate database server or servers. In some embodiments, the one or more databases 515 are relational database(s), such as MySQL database(s). The one or more databases 515 include information accessed and stored by the message server 513 and transmitted from API component 517, and facilitate the operations of the online data management system 507 and the offline index management system 509. For example, the one or more databases 515 may include, without limitation, a plurality of messaging communications organized among a plurality of group-based communication channels, and/or the like.

In this regard, the one or more databases 515 may serve as the primary data storage of the group-based communication system 505. As described hereinafter, the one or more databases 515 store backups (snapshots) of the data storage, and makes these backups available for index generation processes.

The job queue component 519 may be embodied in one or more computers or computing apparatus, such as a server. The job queue component 519 receives data related to electronic messages from client devices 501A-501N (via the message server 513 and the API component 517), processes these data, and transmits the processed data to the cloud storage system 511.

The load balancer component 521 may be embodied in one or more computers or computing apparatus, such as a server or servers. The load balancer component 521 receives database queries from the API component 517 regarding the cloud storage system 511, and improves the distribution of these database queries among various components of the cloud storage system 511.

In some embodiments, the offline index management system 509 comprises one or more data warehouses 531 and an index compiler 533.

The one or more data warehouses 531 are repositories of integrated data related to group-based communication system 505 from one or more disparate sources. For example, as described further below, electronic message data are loaded to the one or more data warehouses 531 from the one or more databases 515. These electronic message data may include, for example, various metadata (as described below) and/or contents of the messages.

The index compiler 533 may process the metadata and/or contents of the message to index the message (e.g., using the conversation primitive as described below) and facilitate various facets of searching (i.e., search queries that return results from the group-based communication system 505). In this regards, the index compiler 533 receives message data from the one or more data warehouses 531, and returns generated index files to the one or more data warehouses 531, which in turn transmit these index files to the cloud storage system 511.

In some embodiments, the cloud storage system 511 comprises a database maintainer component 529 and one or more network databases, such as network databases 523, 525, and 527.

The network databases 523, 525, and 527 store data related to the group-based communication system 505, which includes, for example, index files generated by the index compiler 533. In this regards, the network databases 523, 525, and 527 may store index files associated with electronic messages transmitted from client devices 501A-501N to the group-based communication system 505 via communications network 503. For the purpose of illustration, three network databases 523, 525, and 527 are shown in the figures. It is noted that, in some embodiments of the present invention, more network databases are implemented. In some embodiments, fewer network databases are implemented.

The database maintainer component 529 maintains configuration information and provides distributed synchronization. It manages the network databases 523, 525, and 527. For example, when the cloud storage system 511 receives a query or update, the cloud storage system 511 utilizes the database maintainer component 529 to handle that request. The database maintainer component 529 may also create a cluster for the network databases 523, 525, and 527, streamlining database management.

It is noted that various components in the online data management system 507 may leverage the same computer or computing apparatus to perform the above-described operations. Similarly, various components of the offline index management system 509 may leverage the same computer or computing apparatus to perform the above-described operations, and various components of the cloud storage system 511 may leverage the same computer or computing apparatus to perform the above-described operations.

Example Data Flows of Embodiments of the Present Invention

Embodiments of the present invention achieve the goals of generating data index files that provide fast retrieval and reliable results. Various data flows described herein achieve these goals and overcome various technical difficulties.

Generating Electronic Message

An example of electronic information exchange among one or more client devices 501A-501N and the group-based communication system 505 is described below.

In some embodiments of an example group-based communication system 505, a message or messaging communication may be sent from a client device of client devices 501A-501N to a group-based communication system 505. In various implementations, the message may be sent to the group-based communication system 505 over communications network 503 directly by a client device of client devices 501A-501N. The message may be sent to the group-based communication system 505 via one or more intermediaries, such as message server 513, and/or the like. For example, client devices 501A-501N may be a desktop, a laptop, a tablet, a smartphone, and/or the like that is executing a client application (e.g., a group-based communication app).

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 501A-501N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
        <timestamp>2020-12-31 23:59:59</timestamp>
        <user_accounts_details>
                <user_account_credentials>
                        <user_name>ID_user_1</user_name>
                        <password>abc123</password>
                        //OPTIONAL <cookie>cookieID</cookie>
                        //OPTIONAL
<digital_cert_link>www.mydigitalcertificate.com/
JohnDoeDaDoeDoe@gmail.com/mycertifcate.dc</digital_cert_link>
                        //OPTIONAL
<digital_certificate>_DATA_</digital_certificate>
                </user_account_credentials>
        </user_accounts_details>
        <client_details> //iOS Client with App and Webkit
                        //it should be noted that although several client details
                        //sections are provided to show example variants of
client
                        //sources, further messages will include only on to
save
                        //space
                <client_IP>10.0.0.123</client_IP>
                <user_agent_string>Mozilla/5.0 (iPhone; CPU iPhone OS
7_1_ 1 like Mac OS X) AppleWebKit/537.51.2 (KHTML, like Gecko)
Version/7.0 Mobile/11D201 Safari/9537.53</user_agent_string>
                <client_product_type>iPhone6,1</client_product_type>
        <client_serial_number>DNXXX1X1XXX</client_serial_number>
        <client_UDID>3XXXXXXXXXXXXXXXXXXXXXXXD</client_UDID>
                <client_OS>iOS</client_OS>
                <client_OS_version>7.1.1</client_OS_version>
                <client_app_type>app with webkit</client_app_type>
                <app_installed_flag>true</app_installed_flag>
                <app_name>MSM.app</app_name>
                <app_version>1.0 </app_version>
                <app_webkit_name>Mobile Safari</client_webkit_name>
                <client_version>537.51.2</client_version>
        </client_details>
        <client_details>//iOS Client with Webbrowser
                <client_IP>10.0.0.123</client_IP>
                <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
                <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
                <client_OS>iOS</client_OS>
                <client_OS_version>7.1.1</client_OS_version>
                <client_app_type>web browser</client_app_type>
                <client_name>Mobile Safari</client_name>
                <client_version>9537.53</client_version>
        </client_details>
        <client_details> //Android Client with Webbrowser
                <client_IP>10.0.0.123</client_IP>
                <user_agent_string>Mozilla/5.0 (Linux; U; Android 4.0.4; en-
us; Nexus S Build/IMM76D) AppleWebKit/534.30 (KHTML, like Gecko)
```

-continued

```
Version/4.0 Mobile Safari/534.30</user_agent_string>
            <client_product_type>Nexus S</client_product_type>
        <client_serial_number>YXXXXXXXXZ</client_serial_number>
            <client_UDID>FXXXXXXXXX-XXXX-XXXX-XXXX-
XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details> //Mac Desktop with Webbrowser
            <client_IP>10.0.0.123</client_IP>
            <user_agent_string>Mozilla/5.0 (Macintosh; Intel Mac OS X
10_9_3) AppleWebKit/537.75.14 (KHTML, like Gecko) Version/7.0.3
Safari/537.75.14</user_agent_string>
            <client_product_type>MacPro5,1</client_product_type>
        <client_serial_number>YXXXXXXXXZ</client_serial_number>
            <client_UDID>FXXXXXXXXX-XXXX-XXXX-XXXX-
XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>ID_message_10</message_identifier>
            <team_identifier>ID_team_1</team_identifier>
            <channel_identifier>ID_channel_1</channel_identifier>
            <contents>That is an interesting invention. I have attached a
copy our patent policy.</contents>
            <attachments>patent_policy.pdf</attachments>
        </message>
</auth_request>
```

The group-based communication system 505 comprises at least one message server 513 that may create a storage message based upon the received message to facilitate message storage in one or more databases 515. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the message server 513 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
        <message_identifier>ID_message_10</message_identifier>
        <team_identifier>ID_team_1</team_identifier>
        <channel_identifier>ID_channel_1</channel_identifier>
        <sending_user_identifier>ID_user_1
        </sending_user_identifier>
        <topics>
            <topic>inventions</topic>
            <topic>patents</topic>
            <topic>policies</topic>
        </topics>
        <responses>
            <response>liked by ID_user_2</response>
            <response>starred by ID_user_3</response>
        </responses>
        <contents>That is an interesting invention. I have attached a
copy our patent policy.</contents>
        <attachments>patent_policy.pdf</attachments>
```

-continued

```
        <conversation_primitive>
            conversation includes messages:
ID_message_8, ID_message_9, ID_message_10,
            ID_message_11, ID_message_12
        </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using PHP commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

As described further hereinafter, the above MySQL database command may be modified and used to generate documents for live or computed indexing (via MySQL queries for live indexing in the API component 517 or the job queue component 519, or their equivalent in offline index generation in the index compiler 533).

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. As described hereinafter, the conversation primitives are also used for shingling and searching over conversations (the messages and their surrounding messages).

Writing Electronic Message Data

FIG. 5B illustrates an example diagram 500B showing data flow in writing electronic message data in accordance with some embodiments of the present invention.

In some embodiments, various metadata (determined as described above) and the contents of the message are transmitted from the client devices 501A-501N to the group-based communication system 505 via the communications network 503.

Upon receiving electronic message data from the client devices 501A-501N via communications network 503, the message server 513 processes and prioritizes electronic message data. The message server 513 provides persistent broadcast of electronic messages to the client devices 501A-501N connected to the group-based communication system 505 via the communications network 503. For example, when a user John sends an electronic message in a group-based communication channel using a client device, the message server 513 broadcasts this electronic message to other client devices associated with the same group-based communication channel. In this regard, the message server 513 serves as a message amplifier.

The message server 513 also communicates with the API component 517 to initiate the process of writing electronic message data into the one or more network databases 523, 525, and 527 of the cloud storage system 511. In this regard, copies of the electronic message data are also written into the one or more databases 515. As described hereinafter, the snapshots of data stored in the one or more databases 515 are used in conjunction with offline index management system 509 to build computed indexes, which is a significant store of data, and the majority of the data stored in cloud storage system 511.

In some embodiments, the online data management system 507 implements a job queue component 519 to facilitate the data writing into the network databases 523, 525, and 527. The job queue component 519 maintains a job queue of data that needs to be written into the network databases 523, 525, and 527. The job queue component 519 also updates the job queue in real-time, and prioritizes tasks based on various parameters.

After the job queue component 519 completes the processing, the electronic message data is stored in one or more network databases 523, 525, and 527 of the cloud storage system 511.

Querying Network Database

FIG. 5C illustrates an example diagram 500C showing data flow in querying network databases in accordance with some embodiments of the present invention.

In some embodiments, the group-based communication system 505 receives a network database query from the client devices 501A-501N via the communications network 503. As defined above, a network database query is a request to retrieve data from one or more network databases. For example, when a user John performs a search on the group-based communication channel using a client device, the client device submits a search query to the group-based communication system 505.

Upon receiving the search query, the API component 517 may query the one or more databases 523, 525, and 527 via a load balancer component 521. The load balancer component 521 identifies one or more appropriate network databases from network databases 523, 525, and 527, and further transmits the network database query to the one or more appropriate network databases. By doing so, the load balancer improves the distribution of workloads across network databases 523, 525, and 527, and optimizes network resource use while avoiding overloading any network databases.

The group-based communication system 505 returns the retrieved data to the client devices 501A-501N via the communications network 503.

Loading Data Warehouse

Referring back to FIG. 5A, the online data management system 507 may utilize various data referring tools to load data from the one or more databases 515 to the one or more data warehouses 531. In some embodiments, the one or more databases 515 are relational databases, where data is organized into one or more tables. In this regards, online data management system 507 may implement command-line interface applications to export these tables into a columnar storage format, and then transfer these data into the one or more data warehouses 531.

In addition, the online data management system 507 may also restore any applicable backups in the one or more databases 515. As such, any electronic message that may have been accidentally dropped may be picked up and transferred.

Various embodiments of the present invention provide technical advantages in transferring data from the one or more databases 515 to the one or more data warehouses 531. For example, when the primary databases (for example, the one or more databases 515) have hundreds of shards, each shard may run a backup on its own schedule. As such, inconsistencies exist in terms of backup management across different shards. To make sure that any index produced at any given time is valid as of a particular time point, the system creates a minimum backup timestamp across all shards where data has been transferred (for example, "$T_s$," as shown in FIGS. 9-12 as described hereinafter).

Transforming Data into Index Files

After the data warehouses 531 are loaded, the offline index management system 509 transfers these data into index files. In some embodiments, the index compiler 533 may perform various operations to process the unconstructed data in the data warehouses 531.

In some embodiments, the index compiler 533 transfers these relational data in the data warehouses 531 into a DocJoin structure (as further described herein). By doing so, the relational data is reorganized into non-relational structure, which is easier to feed into subsequent operations.

In addition, each document holds a single message along with all relevant reference data. These reference data may include, for example, metadata associated with the message as described above, such as team identification and channel identification.

Further, the index compiler 533 may receive data in columnar storage format, and output the data in the same columnar storage format, allowing the output data to be read by a variety of computing systems.

In some embodiments, the index compiler 533 transforms these generated DocJoin structures into search index files, which are subsequently transferred to the cloud storage system 511. The index compiler 533 may parcel out these tasks to various nodes within the system and perform these tasks in parallel, thus achieving great system efficiency. In some embodiments, each document may be stored in an index partition of 1,024 total partitions.

Further details are provided herein with regards to the descriptions of FIG. 7.

Bringing New Index Files Online

After the data are transformed into index files, the cloud storage system 511 may bring these index files online. In some embodiments, the cloud storage system 511 may use a collection manager, embodied in one or more computers or computing apparatus, to orchestrate partition placement in the one or more network databases 523, 525, and 527.

As described above, the collection manager reads the computed index metadata (e.g. to determine the number of shards the computed collection was built for), and assigns shards of the computed collection to specific servers. After the shards are loaded as cores on all of the shards, it adjusts the write alias, and begins the synchronization process. Finally, it adjusts the read alias to use the new computed collection.

In some embodiments, the cloud storage system 511 may use a core manager, embodied in one or more computers or computing apparatus, to manage the partitions on a single server, download indexes from the one or more data warehouses 531, and configure the network databases 523, 525, and 527 to serve them.

The core manager may use an API to receive instructions to download a shard of the computed collection from one or more databases. The core manager may also create a core from the downloaded files. As an example, if there are one-thousand (1000) shards in a computed collection, then a single request to the collection manager to load that collection will result in one-thousand (1000) requests to the core managers to download indexes files for those shards.

Applying Recent Changes to Index Files

After the new index files are brought online, the group-based communication system 505 may further update index files to reflect data changes. Further details are provided herein with regards to the descriptions of FIGS. 10-13.

Example Apparatus for Implementing Embodiments of the Present Invention

The index compiler 533 may be embodied by one or more computing systems, such as apparatus 600 shown in FIG. 6. The apparatus 600 may include processor 602, memory 604, input/output circuitry 606, communications circuitry 608, data mapping circuitry 610, document assembly circuitry 612, and index generation circuitry 614. The apparatus 600 may be configured to execute the operations described above with respect to FIG. 5A and below with respect to FIGS. 7-12. Although these components 602-614 are described with respect to functional limitations, it should be understood that the particular implementations necessarily include the use of particular hardware. It should also be understood that certain of these components 602-614 may include similar or common hardware. For example, two sets of circuitries may both leverage use of the same processor, network interface, storage medium, or the like to perform their associated functions, such that duplicate hardware is not required for each set of circuitries.

In some embodiments, the processor 602 (and/or co-processor or any other processing circuitry assisting or otherwise associated with the processor) may be in communication with the memory 604 via a bus for passing information among components of the apparatus. The memory 604 is non-transitory and may include, for example, one or more volatile and/or non-volatile memories. In other words, for example, the memory 604 may be an electronic storage device (e.g., a computer-readable storage medium). The memory 604 may be configured to store information, data, content, applications, instructions, or the like for enabling the apparatus to carry out various functions in accordance with example embodiments of the present invention.

The processor 602 may be embodied in a number of different ways and may, for example, include one or more processing devices configured to perform independently. In some preferred and non-limiting embodiments, the processor 602 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 602 may be configured to execute instructions stored in the memory 604 or otherwise accessible to the processor 602. In some preferred and non-limiting embodiments, the processor 602 may be configured to execute hard-coded functionalities. As such, whether configured by hardware or software methods, or by a combination thereof, the processor 602 may represent an entity (e.g., physically embodied in circuitry) capable of performing operations according to an embodiment of the present invention while configured accordingly. Alternatively, as another example, when the processor 602 is embodied as an executor of software instructions, the instructions may specifically configure the processor 602 to perform the algorithms and/or operations described herein when the instructions are executed.

In some embodiments, the apparatus 600 may include input/output circuitry 606 that may, in turn, be in communication with processor 602 to provide output to the user and, in some embodiments, to receive an indication of a user input. The input/output circuitry 606 may comprise a user interface and may include a display, and may comprise a web user interface, a mobile application, a client device, a kiosk, or the like. In some embodiments, the input/output circuitry 606 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 604, and/or the like).

The communications circuitry 608 may be any means such as a device or circuitry embodied in either hardware or a combination of hardware and software that is configured to receive and/or transmit data from/to a network and/or any other device, circuitry, or module in communication with the apparatus 600. In this regard, the communications circuitry 608 may include, for example, a network interface for enabling communications with a wired or wireless communication network. For example, the communications circuitry 608 may include one or more network interface cards, antennae, buses, switches, routers, modems, and supporting hardware and/or software, or any other device suitable for enabling communications via a network. Additionally or alternatively, the communications circuitry 608 may include the circuitry for interacting with the antenna/antennae to cause transmission of signals via the antenna/antennae or to handle receipt of signals received via the antenna/antennae.

The data mapping circuitry 610 includes hardware configured to map electronic messages and associated metadata received from one or more client devices. The data mapping circuitry 610 may utilize processing circuitry, such as the processor 602, to perform these actions. However, it should also be appreciated that, in some embodiments, the data mapping circuitry 610 may include a separate processor, specially configured Field Programmable Gate Array (FPGA), or Application Specific Integrated Circuit (ASIC) for performing the functions described herein. The data mapping circuitry 610 may be implemented using hardware components of the apparatus configured by either hardware or software for implementing these planned functions.

The document assembly circuitry 612 includes hardware configured to assemble various data structures, such as, for example, DocJoin structure. The document assembly circuitry 612 may utilize processing circuitry, such as the processor 602, to perform these actions. The document assembly circuitry 612 may receive from and transmit data to the data mapping circuitry 610 and the index generation circuitry 614. In some embodiments, the document assembly circuitry 612 may include a separate processor, specially configured Field Programmable Gate Array (FPGA), or Application Specific Integrated Circuit (ASIC). In some implementations, the data mapping circuitry 610 and the index generation circuitry 614 may be sub-circuitries belonging to document assembly circuitry 612. The document assembly circuitry 612 may be implemented using hardware components of the apparatus configured by either hardware or software for implementing the functions described herein.

The index generation circuitry 614 includes hardware configured to index files that is compatible with the network databases 523, 525, and 527. The index generation circuitry 614 may utilize processing circuitry, such as the processor 602, to perform these actions. However, it should also be appreciated that, in some embodiments, the index generation circuitry 614 may include a separate processor, specially configured Field Programmable Gate Array (FPGA), or Application Specific Integrated Circuit (ASIC) for performing the functions described herein. The index generation circuitry 614 may be implemented using hardware components of the apparatus configured by either hardware or software for implementing these planned functions.

It is also noted that all or some of the information discussed herein can be based on data that is received, generated and/or maintained by one or more components of apparatus 600. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 600 may provide or supplement the functionality of particular circuitry. For example, the processor 602 may provide processing functionality, the memory 604 may provide storage functionality, the communications circuitry 608 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Implementing Embodiments of the Present Invention

Various processes described herein provide technical improvements over computer functionalities. More specifically, various processes described herein improves network database indexing and searching functionality in MapReduce.

DocJoin Structure and Index Files

Referring to FIG. 7, an example process 700 for generating DocJoin structures and index files in accordance with some embodiments of the present invention is shown. As described above, DocJoin is a data structure that facilitates the creation of index files. In creating a DocJoin structure, the system takes a stream of message data and joins its associated projection fields. By doing so, associated metadata (including stars, files, etc.) are included in the DocJoin structure.

One of the many technical advantages of the DocJoin structure is a message and all of its potentially related metadata are combined into a single record. In an online data management system (for example, the online data management system 507 as described with regards to FIG. 5A), the message metadata may be all stored in separate tables. If a message has a reaction (i.e., an emoji reaction), for example, there will be a record for the message itself, and a separate record in a different table for the reaction. Additionally, there is a separate record in the "users" table for the author of the message, and a separate record in the "users" table for the user who reacted, and so on.

In generating a document for indexing online (for example, using the one or more databases 515, the API component 517, and the job queue component 519 as described with regards to FIG. 5B), the system has to conduct multiple lookups for each table (for example, using the MySQL interface), which can be time and resource consuming. This is further amplified in MapReduce, where big data sets have to be generated and processed, requiring a number of very costly joins to be built and perhaps billions of records to be shuffled.

The DocJoin structure makes it possible to process this record in the index generation phase (for example, as described hereinafter with regards to generate index 715 of FIG. 7) without and additional data lookups. It is also a suitable format for many other data processing uses, such as understanding the relationship between words in a message and emoji reactions without additional data lookup.

As example DocJoin structure is shown below:

```
struct DocJoin {
    1: Message message,
    3: ChannelInfo channel_info,
    4: optional list<MessageActivity> message_activity,
    6: optional list<Attachments> attachments,
    7: optional list<dimension_projection.StarsProjection> stars,
    8: optional list<dimension_projection.TeamsChannelsSharedProjection> teams_channels_shared,
    9: optional list<dimension_projection.GroupsProjection> groups,
    10: optional list<dimension_projection.GroupsMembersProjection> groups_members,
    11: optional list<dimension_projection.ReactionsProjection> reactions,
    12: optional list<dimension_projection.TeamsChannelsProjection> teams_channels,
    13: optional list<dimension_projection.TeamsImsProjection> teams_ims,
    14: optional list<dimension_projection.ServicesProjection> services,
    16: optional list<dimension_projection.FilesProjection> files,
    17: optional list<dimension_projection.UsersProjection> users,
    18: optional list<dimension_projection.TeamsProjection> teams,
}
```

Referring back to FIG. 7, the process 700 illustrates generating index files based on data from three main data sources: primary source data 703, external channels mapping 705, and enterprise team mapping 707.

The primary source data 703 includes data related to shards in the group-based communication platform. These data are retrieved by the transfer offset sensor 701. One of the primary functions for the transfer offset sensor 701 is to indicate when the backup of all primary database shards (e.g. MySQL databases) is complete for the day, which provides a full and complete corpus of primary source data based on which to build the computed index. By making sure all the primary source data is there, the data integrity of the system is maintained.

From a broader perspective, the external channels mapping 705, enterprise team mapping 707, and team distributions 709 are used for distributing messages and dimensions. More specifically, external channels mapping 705 retrieves data related to externally shared channels and produces a set of "channel_id—target_team_id" pairs for these externally shared channels. Enterprise team mapping 707 associates each team with an enterprise ID (if it is part of an enterprise) and produces "team_id—enterprise_team_id" pairs. In some embodiments of the present invention, these processes may be used to group all dimension rows related to a single enterprise into the same mapper by using the "lifted" enterprise ID as the key. The team distributions 709 further configures dimensions of each team.

The composite dimensions 711 distributes users, teams, stars, reactions, etc. across team-oriented partitions. In some embodiments, the composite dimensions 711 takes the dimension data tables and converts them to thrift records keyed on the "lifted" team id. In some embodiments, the data tables do not contain messages themselves.

More specifically, composite dimensions are distributed by the lifted team id, which means that they are partitioned differently than the way data is partitioned in the primary MySQL databases (e.g., the one or more databases 515), or in the data warehouse mirror (e.g., the one or more data warehouses 531), which are partitioned by ID of the MySQL database shard. The composite dimension partitioning scheme provides technical advantages for message indexing, as all of the message metadata can be found within the domain of the lifted team id.

Further, the composite dimension is a projection (i.e. subset of columns) of the metadata tables from the primary databases. During this process, the system elides columns (i.e. projects away) that aren't important for message indexing. This provides the technical benefit that all data in the composite dimension, for the domain of a given lifted team id, is fit for other structures and subsequent processing.

Table 1 below provides example input to composite dimensions.

TABLE 1 example input for composite dimensions

Teams Table

| Team | Enterprise |
|---|---|
| T1 | E1 |
| T2 | E1 |
| T3 | <NULL> |

Users Table

| User | Team | Name | Join Date | Email |
|---|---|---|---|---|
| U1 | T1 | Anne Allen | 2016-05-02 | anne@ . . . |
| U2 | T2 | George Smith | 2016-07-01 | george@ . . . |
| U3 | T3 | Adam Ramirez | 2016-08-02 | adam@ . . . |

Reactions Table

| Team | User | Name | MessageId | Time |
|---|---|---|---|---|
| T1 | U1 | :thumbsup: | T1-C1-123 | 2017-01-01 |
| T1 | U2 | :wave: | T1-C2-234 | 2017-01-01 |
| T3 | U3 | :thumbsdown: | T2-C4-456 | 2017-01-02 |

Table 2 below provides example output of composite dimensions.

TABLE 2 example input for Composite Dimension

| Lifted Team Key | Composite Value |
|---|---|
| E1 | Users:[{<br>  id: U1,<br>  team: T1<br>},{<br>  id: U2,<br>  team: T2<br>}]<br>Reactions:[{ |

TABLE 2-continued example input for Composite Dimension

| Lifted Team Key | Composite Value |
|---|---|
| |   user: U1,<br>  team: T1,<br>  name: thumbsup<br>  messageId: T1-C1-123<br>},{<br>  user: U1,<br>  team: T1,<br>  name: wave<br>  messageId: T1-C2-234<br>}] |
| T3 | Users:[{<br>  id: U3,<br>  team: T3<br>}]<br>Reactions:[{<br>  user: U1,<br>  team: T1,<br>  name: wave<br>  messageId: T2-C4-456<br>}] |

As shown in Table 2, data in the example composite dimensions is partitioned based on the lifted team id. Further, the composite values are selected for ram.

In document assembly 713, the system creates DocJoin structures with associated dimensions attached (including, e.g., authors, reactions, etc.). In particular, document assembly 713 loads dimensions for each team while streaming message data into the operation. This allows the dimensions to be looked up by simple map access. Table 3 below summarizes various functions that may be used to emulate the PHP indexing and formatting operations to determine which dimensions need to be added to the DocJoin structure.

TABLE 3 doc_join_main functions

| Function | Input | Output |
|---|---|---|
| getMessageGroupedTable | Messages Parquet | OrgTeamOrTeam → MessageDatum groupBy = OrgTeamOrTeam |
| getDocJoinCollection | OrgTeamOrTeam → MessageRow<br>OrgTeamOrTeam → CompositeDimension | DocJoin |

Table 4 below illustrates example input to the getMessageGroupedTable function.

TABLE 4 getMessageGroupedTable input
Messages Table

| Team | Channel | Timestamp | Author | Text |
|---|---|---|---|---|
| T1 | C1 | 123 | U2 | "ready for release" |
| T3 | C4 | 456 | U3 | "didn't work" |
| T2 | C2 | 234 | U1 | "hi everyone" |

Table 5 below illustrates example output of the getMessageGroupedTable function, which is the input for the getDocJoinCollection function, along with the composite dimension output.

TABLE 5 getMessageGroupedTable output
Grouped Messages Table

| OrgTeamOrTeam | Team | Channel | Timestamp | Author | Text |
|---|---|---|---|---|---|
| E1 | T1 | C1 | 123 | U2 | "ready for release" |
| E1 | T2 | C2 | 234 | U1 | "hi everyone" |
| T3 | T3 | C4 | 456 | U3 | "didn't work" |

Table 6 below illustrates various outputs for the getDocJoinCollection function.

TABLE 6 getDocJoinCollection output
DocJoin

```
Message: {
  text: "ready for release"
  author: U2,
  timestamp: 123
  id: T1-C1-123
}
Channel_Info: {
  channel: C1
}
Users:[{
  id: U1,
  team: T1
},{
  id: U2,
  team: T2
}]
Reactions:[{
  user: U1
  team: T1
  name: thumbsup
  messageId: T1-C1-123
}]
Message: {
  text: "hi everyone"
  author: U1,
  timestamp: 234
```

TABLE 6-continued getDocJoinCollection output
DocJoin

```
  id: T1-C2-234
}
Channel_Info: {
  channel: C2
}
Users:[{
  id: U1,
  team: T1
},{
  id: U2,
  team: T2
}]
Reactions:[{
  user: U1
  team: T1
  name: wave
  messageId: T1-C2-234
}]
Message: {
  text: "didn't work"
  author: U3,
  timestamp: 456
  id: T3-C4-456
}
Channel_Info: {
  channel: C4
}
Users:[{
  id: U3,
  team: T3
}]
Reactions:[{
  user: U3
  team: T3
  name: thumbsdown
  messageId: T3-C4-456
}]
```

In generate index 715, the system creates index files based on the DocJoin structure. In particular, generate index 715 takes DocJoin structures and produces indexes that are compatible with network databases. Table 7 below summarizes various functions that may be used during this process.

TABLE 7 solr_index_main functions

| Function | Input | Output | Note |
|---|---|---|---|
| sortDocJoinCollection | DocJoin | TeamPartitionKey → DocJoin (via DocJoinTableFn) TeamPartitionKey is: source_team_id, channel_id, thread_ts, timestamp | partitionBy = team_id, channel_id orderBy team, channel, thread_ts, timestamp |
| convertToShingledSolrDocs | TeamPartitionKey -> DocJoin | SolrInputDocumentWritable | |
| hashed | SolrInputDocumentWritable | Integer -> SolrInputDocumentWritable SolrShardMapFn (uses CompositeId) | |
| writeSolrDoc | SolrInputDocumentWritable | | |

In some embodiments, the solr_index_main functions sort messages by timestamp. Previously, they were only grouped, but not sorted, by the join key (in the example above, T1-C2-234 and T1-C1-123 may have been transposed, and the sort would put them in the proper order).

In some embodiments, to further handle shingling, the sortDocJoinCollection function of the solr_index_main functions also sort the DocJoins according to the order when messages appears. This provides technical advantages of allowing the system to reference previous messages, especially when keeping a small, fixed-size queue of previous messages, and when building the final document.

In some embodiments, the solr_index_main functions passes a hash function over the message ID (for example, T1-C2-234) and produces a special number string (for example, a 32-bit number) using the composite ID router. In some embodiments, the 32-bit integer range can be subdivided into ranges according to the number of shards. For example, if there are 2 shards, there would be two partitions of the range. The shard assignment is based on whether the document is contained by the range.

Live Collection and Computed Collection

FIG. 8 illustrates an example process 800 of handling live collections and computed collections.

As shown in FIG. 8, the API component 517 may query the live collection system 801, as well as the computed collection system 802. The live collection system 801 may comprise one or more live collections 803, 805, 807, and 809, which are generated and managed by the API component 517 and the job queue component 519.

The computed collection system 802 may comprise one or more computed collections 804, 806, 808, and 810, which are generated by the index compiler 533. In this regards, there is no overlap between documents in different collections.

One of the technical advantages of using different collections (instead of one unified collection) is that each collection can have a unique sharding strategy. In addition, creating a collection per time range allows the system to have an arbitrary number of shards based on needs. This provides the technical benefit of future proofing against daily index volume. By partitioning by date-range, the system can set an arbitrary number of shards for each date that scales independently. Each collection/partition is also entirely isolated from the rest of the live indexes, thus the system can drop a particular collection after bringing a computed collection online.

In some embodiments, this time range can be represented by datestamp values associated with each collection. These collections are pre-provisioned into the future to ensure availability when time rolls over to the next collection. Datestamp values may also be used to indicate a dividing line between the end of old collection and the start of the new collection.

In some embodiments, to further distinguish live collections from computed collections, different composite identification (ID) format may be used. For example, a live collection may have the following composite ID format:

chat_{$team_id}-{$channel_id}-{$timestamp} while a computed collection may have the following composite ID format:

{$team_id}/{$groupbits}!chat_{$channel_id}-{$timestamp}

_route_={$team_id}/{$groupbits}!

Prefix

As illustrated above, a prefix may be used to identify message data associated with a particular team. In determining an ideal bit size of the prefix, embodiments of the present invention balance two competing goals.

On one hand, the prefix should specify the narrowest range possible when querying for matching documents. If there are no prefix bits (a single group $2^0=1$), then all shards might contain matching documents. If there are one-thousand (1000) shards in a collection, then all one-thousand shards have to respond to every query request with minimal latency variability, which is more and more unlikely as the number of shards in the collection increases.

On the other hand, the prefix should specify a broad enough range so that any given team's documents are spread across multiple servers. For example, if 31 bits were used (which creates 2.1 billion groups), then each team's data would only reside on a single shard, meaning that only one server would be serving each request, and shards would have extremely different sizes.

In some embodiments of the present invention, the prefix has a 5 bit size.

Collections Synchronization

As described above, existing systems fail to overcome various technical difficulties. For example, given that a computed collection is produced every few days, existing systems fail to signal to live collections which days that a newly computed collection may cover. As another example, there is a time gap between when a computed index is built (for example, a snapshot time point) and when the computed index becomes online (for example, a cut-over time point). During this time gap, existing message data may be changed, but existing systems fail to capture this change.

FIGS. 9-12 illustrate example processes of collection synchronizations that overcome these challenges.

Figure 9:
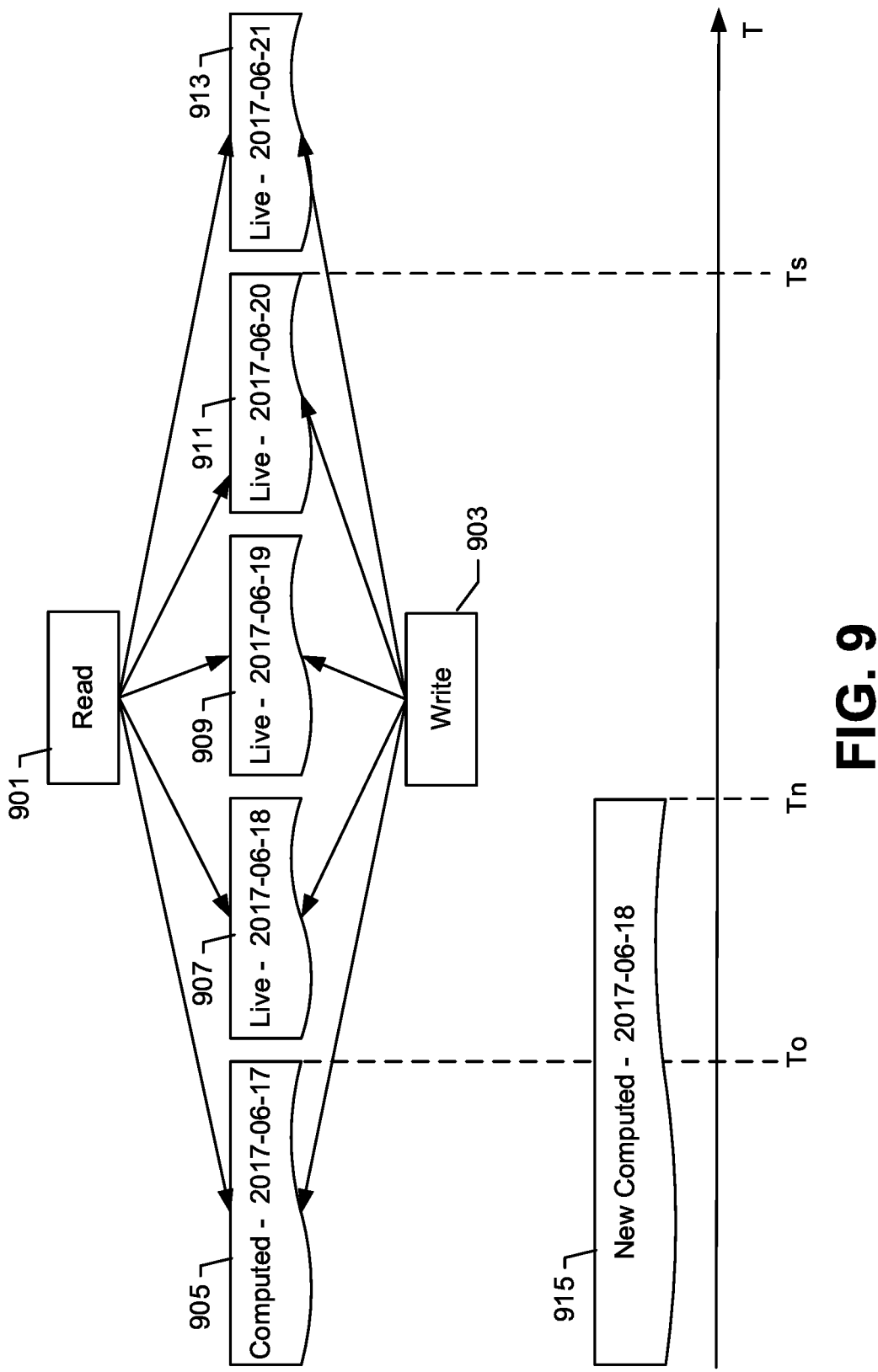

Referring now to FIG. 9, a time axis is shown, which includes indications of various time points. $T_o$ is the end time of the old, in-production collection built from DocJoin operations. For example, as shown in FIG. 9, the old collection 905 includes index files for messages generated prior to Jun. 18, 2017. In some embodiments, the old, computed index collection comprises a plurality of index files, and each index file is associated with a plurality of existing electronic messages. Each electronic message is generated prior to a certain time point. For example, as shown in FIG. 9, each existing electronic message associated with the old collection 905 is generated prior to seventy-two hours (a pre-determined time period) before $T_s$, as described further hereinafter.

$T_n$ is the end time of the new, about-to-be-introduced computed collection built from DocJoin operations. In some embodiments, the system may create an artificial ceiling to only index messages up to a fixed, limited time period. For example, as shown in FIG. 9, the new collection 915 includes index files for messages generated prior to Jun. 19, 2017.

$T_s$ is the snapshot time point of the new, about-to-be-introduced computed collection built from DocJoin operations. In other words, $T_s$ is the DocJoin build date/time for the newly computed collection. As shown in FIG. 9, the new collection 915 was created prior to the beginning of Jun. 21, 2017.

Further, FIG. 9 illustrates various live collections 907, 909, 911, and 913, each containing indexing data corresponds to a particular day. These live collections are associated with a read alias 901 and a write alias 903 of a collection manager.

As described above, the live collections may be generated for future electronic messages. For example, assuming the current date is Jun. 18, 2017, the system may create two live collections into the future. In this regard, before these live collections are created, the read alias 901 may be connected as: read=["computed_2017-06-16", "live_2017-06-17", "live_2017-06-18", "live_2017-06-19"]. The collection manager may create live collection "live_2017-06-20", and update the read alias 901: read=["computed_2017-06-16", live_2017-06-17", live_2017-06-18", live_2017-06-19", "live_2017-06-20"]. The write alias 903 may be operated by the collection manager in a similar manner.

Figure 10:
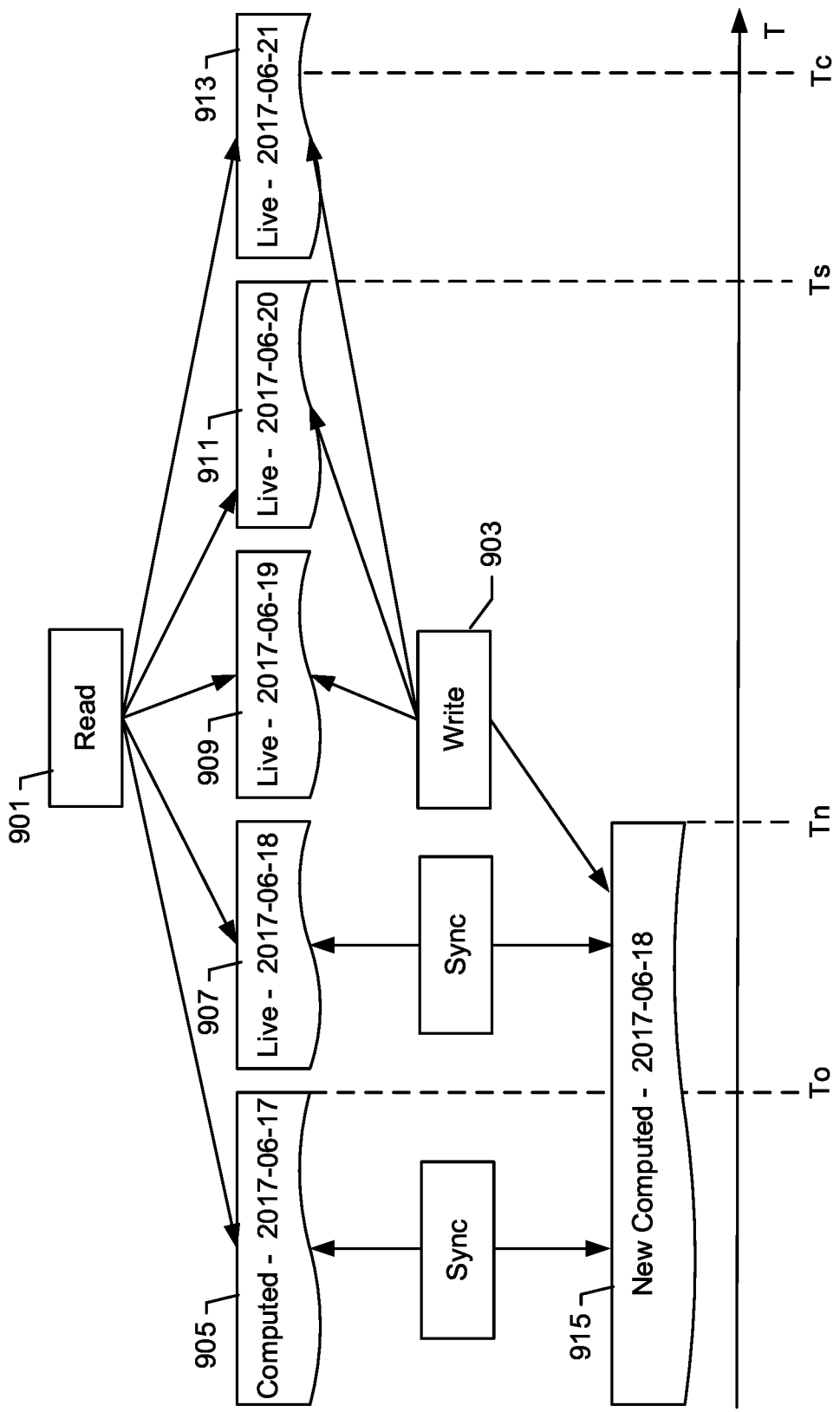

As shown in FIG. 10, the new collection 915 is synced with the old collection 905 and the live collection 907. During this process, the new collection 915 becomes online, and the write alias 903 becomes associated with the new collection 915. In some embodiments, the present invention may make a callback function to the PHP web application to start writing data into the new collection 915. The writing process is completed at a cut-over time point ($T_a$), as shown in the time axis in FIG. 10.

Figure 11:
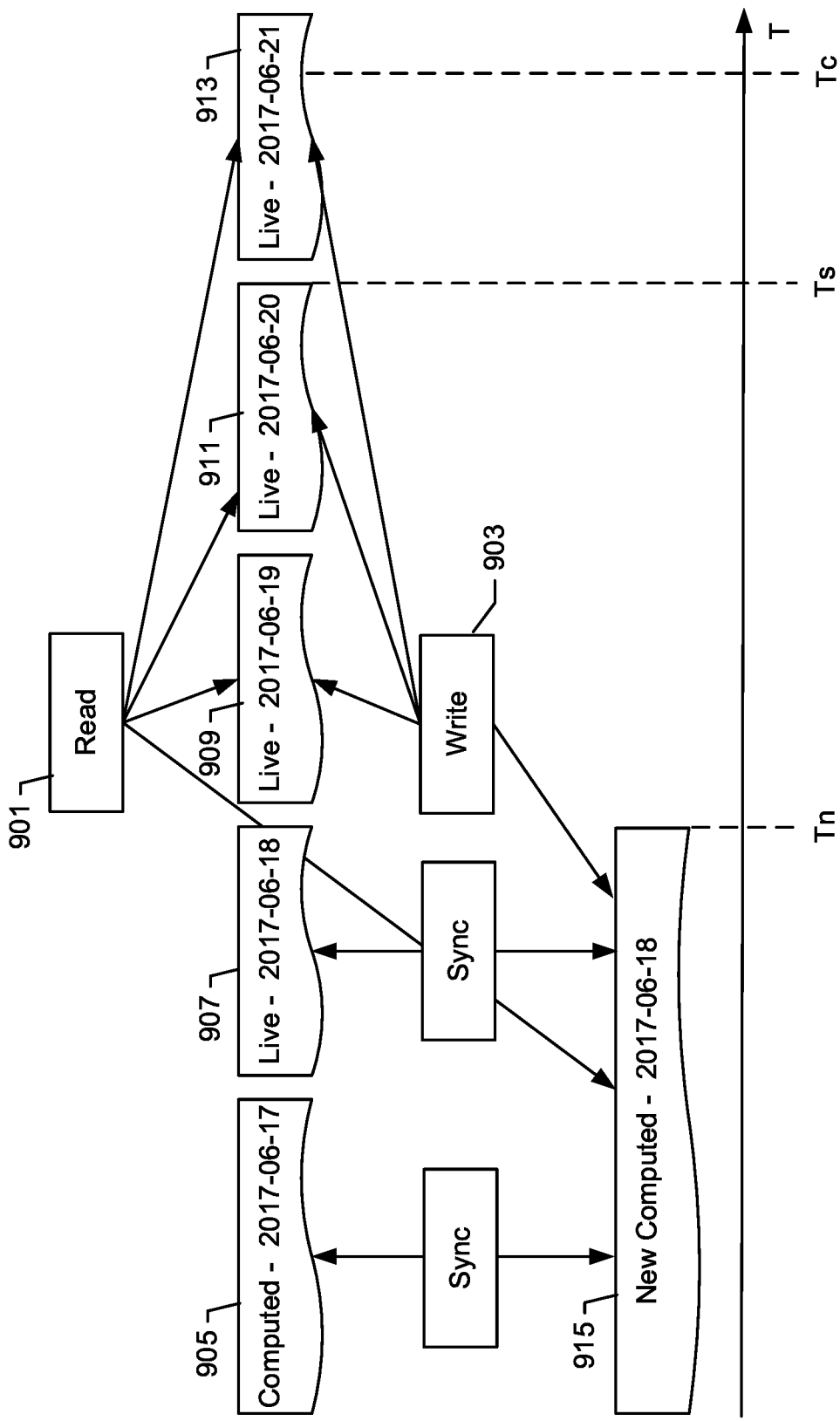

Referring now to FIG. 11, the collection manager queries the live collections 909, 911, and 913 to identify particular electronic messages that (1) are created prior to $T_n$, and (2) are modified between $T_s$ and $T_c$. The present invention further performs data operations on these identified electronic messages. For example, the ID format of these electronic messages may be changed, and metadata related to the modification time is removed. After completing these operations, these electronic messages are transmitted to the new collection 915.

In some embodiments, the present invention systematically identifies electronic messages that are created prior to $T_n$ based on a pre-determined time period and the snapshot time point ($T_s$). For example, as shown in FIG. 11, $T_n$ is forty-eight hours prior to $T_s$. In this example, the present invention programmatically identifies electronic messages that are generated prior to $T_n$ (in other words, forty-eight hours prior to $T_s$). In some embodiments, each electronic message includes metadata in the form of, for example, a message generation timestamp, which indicates when the electronic message was generated (i.e. a message generation time point).

In some embodiments, the present invention systematically determines one or more electronic messages that are modified between $T_s$ and $T_c$ (i.e. modified electronic messages) based on metadata associated with the electronic messages. For example, each electronic message includes metadata in the form of, for example, a message modification timestamp, which indicates when the electronic message was modified (i.e. a message modification time point).

After the synchronization between new collection 915 and the old collection 905, the live collection 907 are completed, the present invention may remove the read alias 901 from the old collection 905 and the live collection 907, and connect the read alias 901 to the new collection 915.

For example, if the new computed collection is "computed_2017-06-18," before completing the synchronization process, the read alias 901 may be connected as: read=["computed_2017-06-16", live_2017-06-17", live_2017-06-18", live_2017-06-19", "live_2017-06-20"]. After the synchronization process is completed, the collection manager may adjust the read alias 901 to be connected as: "read=" [computed_2017-06-18", "live_2017-06-19", "live_2017-06-20"]".

Figure 12:
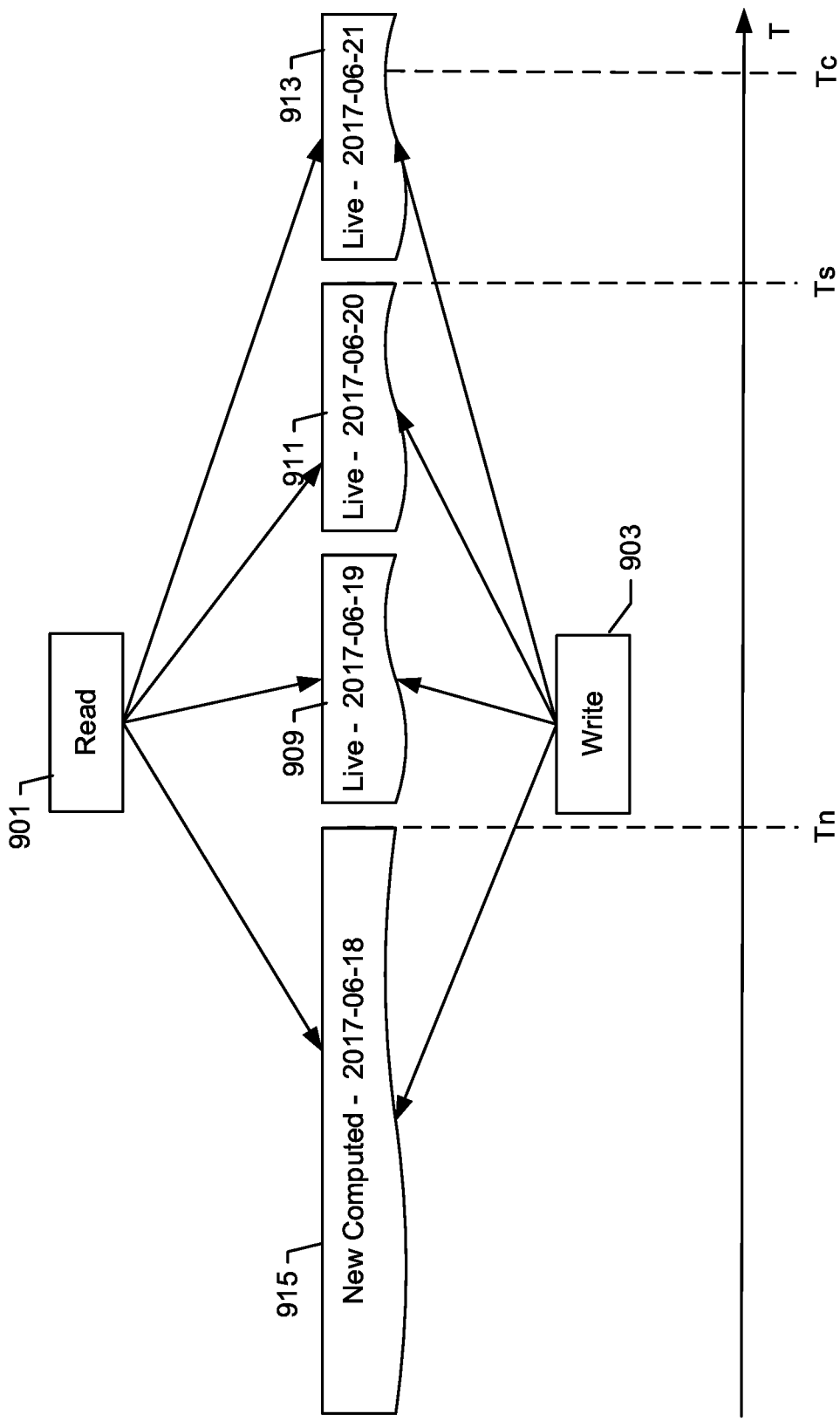

In FIG. 12, the collections synchronization is completed, and the new collection 915 replaces the old collection 905 and the live collection 907.

Various embodiments of the present invention also synchronize collections based on data retention policies. Data retention policies are established protocols for retaining information for operational or regulatory compliance needs. In some embodiments, when a retention policy is executed before a new collection is generated, the system deletes the eligible electronic messages from relevant component(s) of the online data management system, such as, for example, the one or more databases 515. The corresponding search documents are also deleted from relevant component(s) of the cloud storage system 511, such as, for example, the network databases 523, 525, and 527.

In some embodiments, the retention policy may be executed after a new collection is generated but before the new collection goes online. In this regards, when a retention query is executed, a copy of the query may be stored in the cloud storage system 511, as shown in the following programming code:

```
{
    "type":"tombstone_query",
    "query_s":"type:chat          AND
team_id_tl:12262681329            AND
channel_ids_tlm:12262831345 AND timestamp_tl:[* TO
1510182212000000]",
    "reason_s":"data_retention",
    "mtime_tl":1510182213
}
```

By doing so, during the collection synchronizing process, when the system queries all modified documents, any retention deletion documents are identified.

Additional Implementation Details

Although example processing systems have been described in FIGS. 5-6, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for improving data indexing in a group-based communication platform, the group-based communication platform having a computed collection and one or more live collections, the computer-implemented method comprising:
    generating, by a server circuitry, a new collection at a snapshot time point, wherein the new collection comprises a plurality of shards based at least in part on one or more of a channel identification, a team identification, or a group identification, wherein individual shards of the plurality of shards store message data related to a plurality of existing electronic messages associated with the group-based communication platform and at least one index file associated with the message data;
    associating, by the server circuitry, a collection manager with the new collection, the collection manager having a read alias and a write alias pointing to the computed collection and the one or more live collections;
    retrieving, by the server circuitry, a plurality of electronic messages from the computed collection and the one or more live collections, each electronic message having a message generation timestamp indicating a message generation time point before the snapshot time point;
    writing, by the server circuitry, the plurality of electronic messages to the new collection, the writing being completed at a cut-over time point;
    synchronizing, by the server circuitry, the new collection with the one or more live collections based on the plurality of electronic messages by:
        retrieving one or more modified electronic messages, each modified electronic message having a message modification timestamp indicating a message modification time point between the snapshot time point and the cut-over time point;
        writing the one or more modified electronic messages to the new collection;
        identifying an electronic message of the plurality of electronic messages and the one or more modified electronic messages with the message generation timestamp that exceeds a time period associated with a data retention policy of the group-based communication platform; and
        removing the electronic message from the new collection; and
    replacing the computed collection and at least one live collection of the one or more live collections with the new collection by redirecting the read alias and the write alias from the computed collection and the at least one live collection to the new collection and removing the computed collection and the at least one live collection from the group-based communication platform.

2. The computer-implemented method of claim 1, wherein the at least one index file is generated by: creating composite dimensions based on the message data; generating DocJoin structures based on the composite dimensions; and outputting the at least one index file based on the DocJoin structures.

3. The computer-implemented method of claim 1, wherein the computed collection comprises a plurality of index files, the plurality of index files being associated with a plurality of existing electronic messages, the plurality of existing electronic messages being generated prior to a second pre-determined time period before the snapshot time point.

4. The computer-implemented method of claim 1, further comprising: identifying, by the server circuitry, the at least one live collection associated with the plurality of electronic messages from the one or more live collections; and disconnecting, by the server circuitry, the at least one live collection from the read alias and the write alias.

5. The computer-implemented method of claim 1, further comprising: retrieving a retention policy associated with the plurality of electronic messages from a database associated with the group-based communication platform.

6. An apparatus for improving data indexing in a group-based communication platform, the group-based communication platform having a computed collection and one or more live collections, the apparatus comprising at least one processor and at least one non-transitory memory including program code, the at least one non-transitory memory and the program code configured to, with the at least one processor, cause the apparatus to at least:
    generate, by a server circuitry, a new collection at a snapshot time point, wherein the new collection comprises a plurality of shards based at least in part on one or more of a channel identification, a team identification, or a group identification, wherein individual shards of the plurality of shards store message data related to a plurality of existing electronic messages associated with the group-based communication platform and at least one index file associated with the message data;
    associate, by the server circuitry, a collection manager with the new collection, the collection manager having a read alias and a write alias pointing to the computed collection and the one or more live collections;

retrieve, by the server circuitry, a plurality of electronic messages from the computed collection and the one or more live collections, each electronic message having a message generation timestamp indicating a message generation time point before the snapshot time point;

write, by the server circuitry, the plurality of electronic messages to the new collection, the writing being completed at a cut-over time point;

synchronize, by the server circuitry, the new collection with the one or more live collections based on the plurality of electronic messages by:

retrieving one or more modified electronic messages, each modified electronic message having a message modification timestamp indicating a message modification time point between the snapshot time point and the cut-over time point;

writing the one or more modified electronic messages to the new collection;

identifying an electronic message of the plurality of electronic messages and the one or more modified electronic messages with the message generation timestamp that exceeds a time period associated with a data retention policy of the group-based communication platform; and removing the electronic message from the new collection; and replace the computed collection and at least one live collection of the one or more live collections with the new collection by redirecting the read alias and the write alias from the computed collection and the at least one live collection to the new collection and remove the computed collection and the at least one live collection from the group-based communication platform.

7. The apparatus of claim 6, wherein the at least one index file is generated by: creating composite dimensions based on the message data; generating DocJoin structures based on the composite dimensions; and outputting the at least one index file based on the DocJoin structures.

8. The apparatus of claim 6, wherein the computed collection comprises a plurality of index files, the plurality of index files being associated with a plurality of existing electronic messages, the plurality of existing electronic messages being generated prior to a second pre-determined time period before the snapshot time point.

9. The apparatus of claim 6, wherein the at least one non-transitory memory and the program code are configured to, with the at least one processor, cause the apparatus to further: identify, by the server circuitry, the at least one live collection associated with the plurality of electronic messages from the one or more live collections; and disconnect, by the server circuitry, the at least one live collection from the read alias and the write alias.

10. The apparatus of claim 6, wherein the at least one non-transitory memory and the program code are configured to, with the at least one processor, cause the apparatus to further: retrieve the data retention policy associated with the plurality of electronic messages from a database associated with the group-based communication platform.

11. The apparatus of claim 6, wherein a modified electronic message comprises modified metadata that is different from metadata associated with an original electronic message corresponding to the modified electronic message.

12. A computer program product for improving data indexing in a group-based communication platform, the group-based communication platform having a computed collection and one or more live collections, the computer program product comprising at least one non-transitory computer-readable storage medium having computer-readable program code portions stored therein, the computer-readable program code portions comprising an executable portion configured to:

generate, by a server circuitry, a new collection at a snapshot time point, wherein the new collection comprises a plurality of shards based at least in part on one or more of a channel identification, a team identification, or a group identification, wherein individual shards of the plurality of shards store message data related to a plurality of existing electronic messages associated with the group-based communication platform and at least one index file associated with the message data;

associate, by the server circuitry, a collection manager with the new collection, the collection manager having a read alias and a write alias pointing to the computed collection and the one or more live collections;

retrieve, by the server circuitry, a plurality of electronic messages from the computed collection and the one or more live collections, each electronic message having a message generation timestamp indicating a message generation time point before the snapshot time point;

write, by the server circuitry, the plurality of electronic messages to the new collection, the writing being completed at a cut-over time point;

synchronize, by the server circuitry, the new collection with the one or more live collections based on the plurality of electronic messages by:

retrieving one or more modified electronic messages, each modified electronic message having a message modification timestamp indicating a message modification time point between the snapshot time point and the cut-over time point;

writing the one or more modified electronic messages to the new collection;

identifying an electronic message of the plurality of electronic messages and the one or more modified electronic messages with the message generation timestamp that exceeds a time period associated with a data retention policy of the group-based communication platform; and removing the electronic message from the new collection; and replace the computed collection and at least one live collection of the one or more live collections with the new collection by redirecting the read alias and the write alias from the computed collection and the at least one live collection to the new collection and remove the computed collection and the at least one live collection from the group-based communication platform.

13. The computer program product of claim 12, wherein the at least one index file is generated by: creating composite dimensions based on the message data; generating DocJoin structures based on the composite dimensions; and outputting the at least one index file based on the DocJoin structures.

14. The computer program product of claim 12, wherein the computed collection comprises a plurality of index files, the plurality of index files being associated with a plurality of existing electronic messages, the plurality of existing electronic messages being generated prior to a second pre-determined time period before the snapshot time point.

15. The computer program product of claim 12, wherein the computer-readable program code portions comprising the executable portion configured to further: identify, by the server circuitry, the at least one live collection associated with the plurality of electronic messages from the one or more live collections; and disconnect, by the server circuitry, the at least one live collection from the read alias and the write alias.

16. The computer program product of claim 12, wherein a modified electronic message comprises modified metadata that is different from metadata associated with an original electronic message corresponding to the modified electronic message.

\* \* \* \* \*